US010079837B2

(12) United States Patent
Verma

(10) Patent No.: US 10,079,837 B2
(45) Date of Patent: Sep. 18, 2018

(54) DISTRIBUTED TOPOLOGY ENABLER FOR IDENTITY MANAGER

(71) Applicant: International Business Machines Corporation, Armonk, NY (US)

(72) Inventor: Girish B. Verma, Herndon, VA (US)

(73) Assignee: International Business Machines Corporation, Armonk, NY (US)

( * ) Notice: Subject to any disclaimer, the term of this patent is extended or adjusted under 35 U.S.C. 154(b) by 43 days.

(21) Appl. No.: 15/229,744

(22) Filed: Aug. 5, 2016

(65) Prior Publication Data
US 2016/0344748 A1 Nov. 24, 2016

Related U.S. Application Data

(63) Continuation of application No. 12/982,043, filed on Dec. 30, 2010, now Pat. No. 9,430,291.

(51) Int. Cl.
| | |
|---|---|
| *G06F 15/173* | (2006.01) |
| *H04L 29/06* | (2006.01) |
| *G06F 9/50* | (2006.01) |
| *G06F 21/45* | (2013.01) |

(52) U.S. Cl.
CPC .......... *H04L 63/126* (2013.01); *G06F 9/5027* (2013.01); *G06F 21/45* (2013.01); *H04L 63/0815* (2013.01); *H04L 63/10* (2013.01); *G06F 2209/5017* (2013.01)

(58) Field of Classification Search
None
See application file for complete search history.

(56) References Cited

U.S. PATENT DOCUMENTS

| | | | |
|---|---|---|---|
| 6,064,656 A | * | 5/2000 | Angal ................. G06F 21/6218 370/254 |
| 6,389,126 B1 | | 5/2002 | Bjomberg et al. |
| 7,206,934 B2 | | 4/2007 | Pabla et al. |

(Continued)

FOREIGN PATENT DOCUMENTS

| | | |
|---|---|---|
| JP | 2003162509 | 6/2003 |
| JP | 2009193336 | 8/2009 |
| JP | 2012141969 | 7/2012 |

OTHER PUBLICATIONS

Information Materials for IDS, dated Jul. 8, 2015, Total 4 pages.

(Continued)

*Primary Examiner* — Younes Naji
(74) *Attorney, Agent, or Firm* — Janaki K. Davda; Konrad, Raynes, Davda and Victor LLP

(57) ABSTRACT

Provided are techniques for combining existing identity management information from multiple Identity Manager (IM) nodes. The combined information from the multiple IM nodes is presented. A provisioning request to change the identity management information is received. The provisioning request is decomposed to form multiple, separate sub-requests. One or more IM nodes are identified to process the sub-requests. The sub-requests are issued to the one or more IM nodes in parallel. A status of each of the sub-requests is received from each of the one or more IM nodes that is processing that sub-request. The received statuses are combined. The combined statuses are returned as a status of the provisioning request.

12 Claims, 49 Drawing Sheets

(56) References Cited

U.S. PATENT DOCUMENTS

| | | | |
|---|---|---|---|
| 7,346,923 B2 | 3/2008 | Atkins et al. | |
| 7,376,658 B1 | 5/2008 | Bumgarner et al. | |
| 7,453,842 B2 | 11/2008 | Yamamoto | |
| 7,512,585 B2 | 3/2009 | Agarwal et al. | |
| 7,519,667 B1* | 4/2009 | Capps | H04L 51/046 709/203 |
| 7,552,321 B2 | 6/2009 | Rockwood et al. | |
| 7,577,729 B1* | 8/2009 | Umbehocker | G06F 3/0607 709/213 |
| 8,204,523 B1 | 6/2012 | Schroeder et al. | |
| 8,965,920 B2* | 2/2015 | Jin | G06F 17/30569 707/770 |
| 9,036,200 B2* | 5/2015 | Kamath | G06F 3/1212 358/1.13 |
| 9,519,703 B2* | 12/2016 | Agarwal | G06F 17/30663 |
| 2002/0075304 A1* | 6/2002 | Thompson | G06F 3/0481 715/751 |
| 2003/0050969 A1 | 3/2003 | Sant et al. | |
| 2007/0072677 A1 | 3/2007 | Lavoie et al. | |
| 2007/0208744 A1* | 9/2007 | Krishnaprasad | G06F 21/6227 |
| 2008/0033920 A1* | 2/2008 | Colclasure | G06F 17/30442 |
| 2008/0104220 A1 | 5/2008 | Vanyukhin et al. | |
| 2008/0320576 A1 | 12/2008 | Curling | |
| 2009/0006468 A1 | 1/2009 | Shankar et al. | |
| 2009/0083367 A1 | 3/2009 | Li et al. | |
| 2009/0249076 A1 | 10/2009 | Reed et al. | |
| 2010/0030889 A1 | 2/2010 | Fuchs et al. | |
| 2010/0169351 A1* | 7/2010 | Kulkarni | G06F 17/30879 707/759 |
| 2011/0010544 A1 | 1/2011 | Inaba | |
| 2011/0219422 A1* | 9/2011 | Shen | G06F 15/16 726/1 |
| 2012/0099858 A1 | 4/2012 | Moore et al. | |
| 2012/0173725 A1 | 7/2012 | Verma | |
| 2012/0310916 A1* | 12/2012 | Abadi | G06F 17/30445 707/713 |
| 2017/0060856 A1* | 3/2017 | Turtle | G06F 17/30 |

OTHER PUBLICATIONS

US Publication 2011/0010544, dated Jan. 13, 2011 is an English counterpart to JP2009193336, dated Aug. 27, 2009.

US Publication 20120173725, dated Jul. 5, 2012 is an English counterpart to JP2012141969, dated Jul. 26, 2012.

U.S. Patent Application, dated Dec. 30, 2010, for U.S. Appl. No. 12/982,043 (22.147), filed Dec. 30, 2010, invented by Girish B.Verma, Total 93 pages.

Office Action, dated Jun. 19, 2013, for U.S. Appl. No. 12/982,043 (22.147), filed Dec. 30, 2010, invented by Girish B.Verma, Total 27 pages.

Response to Office Action, dated Sep. 19, 2013, for U.S. Appl. No. 12/982,043 (22.147), filed Dec. 30, 2010, invented by Girish B. Verma, Total 15 pages.

Final Office Action, dated Apr. 25, 2014, for U.S. Appl. No. 12/982,043 (22.147), filed Dec. 30, 2010, invented by Girish B.Verma, Total 33 pages.

Response to Final Office Action, dated Jul. 24, 2014, for U.S. Appl. No. 12/982,043 (22.147), filed Dec. 30, 2010, invented by Girish B.Verma, Total 14 pages.

Office Action, dated Sep. 15, 2015, for U.S. Appl. No. 12/982,043 (22.147), filed Dec. 30, 2010, invented by Girish B.Verma, Total 31 pages.

Response to Office Action, dated Dec. 9, 2015, for U.S. Appl. No. 12/982,043 (22.147), filed Dec. 30, 2010, invented by Girish B. Verma, Total 12 pages.

Notice of Allowance, dated Feb. 11, 2016, for U.S. Appl. No. 12/982,043 (22.147), filed Dec. 30, 2010, invented by Girish B.Verma, Total 27 pages.

Notice of Allowance, dated May 20, 2016, for U.S. Appl. No. 12/982,043 (22.147), filed Dec. 30, 2010, invented by Girish B.Verma, Total 9 pages.

* cited by examiner

DTEIM Administration

Perform DTEIM administration activities

| Import Topology From Global IM |
|---|

500

IM Nodes

| View Node Services | Add IM Node |
|---|---|

| Interrogate IM Node | Delete Node |
|---|---|

| | IM Node Id | Main Node | IM Node Description | IM Version | IM Fixpack Level | IM Node URL | Inactive node / reason | Test Connection |
|---|---|---|---|---|---|---|---|---|
| ☐ | blue | ⦿ | A Global IM | 5.0 | -1 | http://blueserver:9080 | ☐ | Test |
| ☐ | green | ○ | credit card IM | 5.0 | -1 | http://greenserver:9080/ | ☐ | Test |
| ☐ | red | ○ | Red node | Unknown | Unknown | http://redserver:9080 | ☑ Red node is down until its configuration is completed | Test |

| Submit | Cancel |
|---|---|

Manage Requests — 1400

Select requests to display
Select an IM node (or All IM Nodes)    [All IM Nodes ▾]
Select requests    [Show completed requests ▾] [Submitted ▾] [In Last 31 days ▾]
[Submit Query]

| IM Node | Request Type | Date Submitted | Status | Account/Access |
|---|---|---|---|---|
| blue | Add Provisioning Policy | 02-13-2009 08:32:43 | Succeeded | Default Provisioning Policy for service dummy on |
| green | Change User Data | 02-23-2009 13:56:09 | Succeeded | Joe B |
| green | Change User Data | 02-23-2009 13:56:06 | Succeeded | Joe B |
| green | Change User Data | 02-23-2009 13:48:51 | Succeeded | Firstname Lastname |
| green | Change Account | 02-18-2009 18:43:09 | Succeeded | flastname@us.corp.com on IM Service |
| green | Change User Data | 02-02-2009 22:12:25 | Succeeded | Firstname Lastname |
| green | Change User Data | 02-02-2009 22:02:09 | Succeeded | Firstname Lastname |
| green | Change User Data | 02-02-2009 21:54:23 | Succeeded | Firstname Lastname |
| green | Change User Data | 02-01-2009 17:06:27 | Succeeded | Firstname Lastname |
| green | Change User Data | 02-01-2009 14:56:42 | Succeeded | Firstname Lastname |
| green | Change User Data | 02-01-2009 14:56:31 | Succeeded | Firstname Lastname |

FIG. 14

Manage To Do Items

▽ Select IM node(s) from which To Do items will be retrieved (default is All)

Select a node from which you want to list to do items, or select All IM nodes [All IM Nodes ▽]

[Submit Query]

| Approval Requests (0) | Request(s) For Information (1) | Workorder Requests (0) | Grouped Recertification Requests (2) | Compliance Alerts (0) |
|---|---|---|---|---|

Click an activity to review it and provide information

| IM Node Name | Assignment Type | Activity | Time due | Requestee | Requester | Account/Access |
|---|---|---|---|---|---|---|
| blue | Provide Information | RFI | 03-04-2009 19:19:20 | Firstname Lastname | Firstname Lastname | abc123121 on LDAP base service |

Review Grouped Recertification Request

*The grouped recertification request has the following items*

Click an activity to review it before approving it, or select activities and use the Bulk Approve or Bulk Reject Buttons

| | IM Node Name | Assignment Type | Activity | Time due | Requested For | Requested By | Account/Access |
|---|---|---|---|---|---|---|---|
| ☑ | green | Approval/Reject | Recertification Approval | 03-07-2009 08:39:32 | Joe B | requesterType.P | ab1021001 on LDAP base service |
| ☑ | green | Approval/Reject | Recertification Approval | 03-07-2009 08:39:32 | Firstname Lastname | requesterType.P | user1 on LDAP base service |
| ☑ | green | Approval/Reject | Recertification Approval | 03-07-2009 08:39:31 | Firstname Lastname | requesterType.P | 9b0123896 on LDAP base service |
| ☑ | green | Approval/Reject | Recertification Approval | 03-07-2009 08:39:31 | Firstname Lastname | requesterType.P | user2 on LDAP base service |
| ☑ | green | Approval/Reject | Recertification Approval | 03-07-2009 08:39:31 | System Administrator | requesterType.P | imadmin on LDAP base service |

[Bulk Approve] [Bulk Reject] [Go Back]

```
package com.corp.dteim.examples;
import com.corp.dteim.im.provider.AuthenticationServiceProvider;
import com.corp.dteim.model.face.IMCredential;
public class ExampleAuthentication {
    public void exampleAuthenticate() {
        String userid = "flastname";
        String password = "secret";
        // Create an unauthenticated IMCredential object with userid and
        //password.  Password should be null if SSO is enabled.
        IMCredential imCred = new IMCredential(userid,
                password);
        // Instantiate AuthInfo and authenticate. AuthInfo is a DTEIM
        // topology aware API that finds the main IM node, authenticates
        //against it, and loads a node map of the topology
        AuthInfo authInfo = new AuthInfo(imCred);
        try {
            authInfo.authenticate();
            // The external application should cache the AuthInfo
            // object. Subsequent Provider API calls are passed the
            // AuthInfo object as an authentication and authorization
            // object. Here is an example using PersonServiceProvider.
            Person person = new
            PersonServiceProvider(authInfo).getDPersonPrincipal();
            // The IMCredential object has methods to determine if
            // the principal is an Administrator or regular user, or if the
            // user is authenticated.
            boolean admin = authInfo.getimCred().isAdministrator();
            boolean authenticated =   authInfo.getimCred.isAuthenticated();
        } catch (Exception e) {
            e.printStackTrace();
        }
    }
}
```

FIG. 17

```
// authInfo contains authentication info.
        String ownerDN = authInfo.getOwnerStubDN();
        Collection accountStubs = null;
        Map nodeMap = authInfo.getNodeMap();
        try {
                // Get a collection of DAccountStub objects for the owner.
                accountStubs = new
                        DAccountStubSearch().searchByOwner(ownerDN,
                        nodeMap);
        } catch (NamingException e) {
                e.printStackTrace();
        } catch (DLDAPServerException e) {
                e.printStackTrace();
        }
// To retrieve the full account attributes for any account stub use the
AccountServiceProvider API.
// dAccountStub is a DAccountStub object whose full account
attributes are to be retrieved.
try {
        AttributeValues accountAttributes =
                AccountServiceProvider.getAccountAttributes(selectedAc
                count, authInfo);
} catch (MalformedURLException e) {
        e.printStackTrace();
} catch (RemoteException e) {
        e.printStackTrace();
} catch (ServiceException e) {
        e.printStackTrace();
} catch (DteimFatalException e) {
        e.printStackTrace();
}
```

```
// authInfo contains AuthInfo authenticated object
accountProvider = new AccountServiceProvider(authInfo);
DPersonStub ownerStub; // set this to the owner's stub.
String accountType =AccountServiceProvider.ENDPOINT_ACCOUNTS;
String selectedNode = "*";  // Select all IM nodes.
try {
   Collection accountStubs =
      accountProvider.getAccountStubsByOwner(
      ownerStub, accountType, selectedNode);
```

FIG. 19

```
// authInfo contains authentication info.
// serviceStub is a DServiceStub object of the service on which account is
//to be provisioned.
// accountStub is a DAccountStub object of the account to be updated.
// accountAttributes is an AttributeValues object containing account
//attributes to be created or updated.
// createAccount is a boolean, true if account is to be created, false if
account is to be updated.
try {
      if (createAccount) {
            long requestId =
      AccountServiceProvider.createAccount(authInfo,
                  serviceStub, accountAttributes);
      } else {
            long requestId =
      AccountServiceProvider.updateAccount(authInfo,
                  accountStub, accountAttributes);
      }
} catch (Exception e) {
      e.printStackTrace();
}
```

```
// authInfo contains authentication info.
try {
        Collection authorizedServiceStubs =
                    PersonServiceProvider.getAuthorizedServices(authInfo);
} catch (ServiceException e) {
        e.printStackTrace();
} catch (MalformedURLException e) {
        e.printStackTrace();
} catch (RemoteException e) {
        e.printStackTrace();
} catch (NamingException e) {
        e.printStackTrace();
} catch (DLDAPServerException e) {
        e.printStackTrace();
} catch (DteimFatalException e) {
        e.printStackTrace();
}
```

FIG. 21

```
// authInfo contains authentication info.
DteimForm dteimForm;
Person dPerson = authInfo.getDPerson();
AttributeValues personAvs = dPerson.getAttributeValues();
// Get the person attributes
FormProvider formProvider = new FormProvider(authInfo,
      authInfo.getPrimaryNodeId());
try {
      dteimForm =
            formProvider.makeDteimForm(((DteimPerson)dPerson).get
            ProfileName(), personAvs);
} catch (MalformedURLException e) {
      e.printStackTrace();
} catch (RemoteException e) {
      e.printStackTrace();
} catch (ServiceException e) {
      e.printStackTrace();
} catch (DteimFatalException e) {
      e.printStackTrace();
}
```

FIG. 22

```
// authInfo contains authentication info.
// accountStubs is a Collection of dAccountStubs of accountsfor //which
password rules are to be retrieved.
try {
    WSPasswordRulesInfo passwordRules =
        AccountServiceProvider.getPasswordRules(authInfo,
        accountStubs);
} catch (Exception e) {
    e.printStackTrace();
}
```

```
boolean passwordValid = false;
String password = "newPasswordValue";
if (!accountStubs.isEmpty()) {
    try {
    Collection nodeAwareaAccountMOs = new ArrayList();
    long dRequestId;
    passwordValid =
            AccountServiceProvider.isPasswordValid(authInfo,
            accountStubs, password, nodeAwareAccountMOs);
    if (passwordValid) {
        long dRequestId = new
                AccountServiceProvider().
                changePassword(authInfo,
                nodeAwareAccountMOs, password);
    }
    } catch (Exception e) {
    }
}
```

```
// authInfo contains authenticated AuthInfo object.
ToDoProvider toDoProvider = new ToDoProvider(authInfo);
String selectedNode = "*";  // Select all IM nodes
Collection assignments = toDoProvider.getToDoList(selectedNode);
```

Objectclass diAccountStub

The diAccountStub represents attributes of an account stub.

OID: diAccountStub-OID
NAME: diAccountStub
Parent objectclass: top
Mandatory attributes: None
Optional attributes: diAccountStatus,
　　　　　　　　　　diErGlobalId,
　　　　　　　　　　diitimdn,
　　　　　　　　　　diNodeGlobalId,
　　　　　　　　　　diNodeId,
　　　　　　　　　　diServiceDN,
　　　　　　　　　　diUid,
　　　　　　　　　　owner

Objectclass diNodeItem

The diNodeItem objectclass represents attributes of a node configuration.

OID: diNodeItem-OID
NAME: diNodeItem
Parent objectclass: top
Mandatory attributes: diNodeId
Optional attributes: diNodeDeleted,
　　　　　　　　　　diNodeDesc,
　　　　　　　　　　diNodeInactive,
　　　　　　　　　　diNodeInactiveReason,
　　　　　　　　　　diNodeURL,
　　　　　　　　　　diPrimaryNode,
　　　　　　　　　　diNodeVersion,
　　　　　　　　　　diNodeFixpackLevel

Objectclass diPersonStub

The diPersonStub objectclass represents attributes of a person stub.

OID: diPersonStub-OID
Name: diPersonStub
Parent objectclass: top
Mandatory attributes: None
Optional attributes: cn,
     diCustomDisplay,
     diErGlobalId,
     diitimdn,
     diNodeGlobalId,
     diNodeId,
     diPersonStatus,
     givenName,
     owner,
     sn

Objectclass diRequestStub

The diRequestStub objectclass represents attributes of a request object.

OID: diRequestStub-OID
Name: diRequestStub
Parent objectclass: top
Mandatory attributes: None
Optional attributes: diNodeId,
     diNodeRequestId,
     diRequestDescription,
     diRequestId,
     diRequestRequestee,
     diRequestStatus,
     diRequestSubject,
     diRequestTimeCompleted,
     diRequestTimeScheduled,
     diRequestTimeSubmitted,
     diRequestTitle,
     owner

Objectclass diServiceStub

The diServiceStub objectclass represents attributes of a service stub.

OID: diServiceStub-OID
Name: diServiceStub
Parent objectclass: top
Mandatory attributes: None
Optional attributes: diErGlobalId,
　　　　　　　　　diimdn,
　　　　　　　　　diNodeGlobalId,
　　　　　　　　　diNodeId,
　　　　　　　　　diObjectProfileName,
　　　　　　　　　diPrereqServiceDN,
　　　　　　　　　diServiceName

```
IMWebServiceFactory factory = new
IMWebServiceFactory("http://host/IMWebServices");
WSSession session =
factory.getWSSessionService().login(userid, password);
WSPersonService personService =
factory.getWSPersonService();
WSPerson myPerson =
personService.getPrincipalPerson(session);
```

FIG. 31

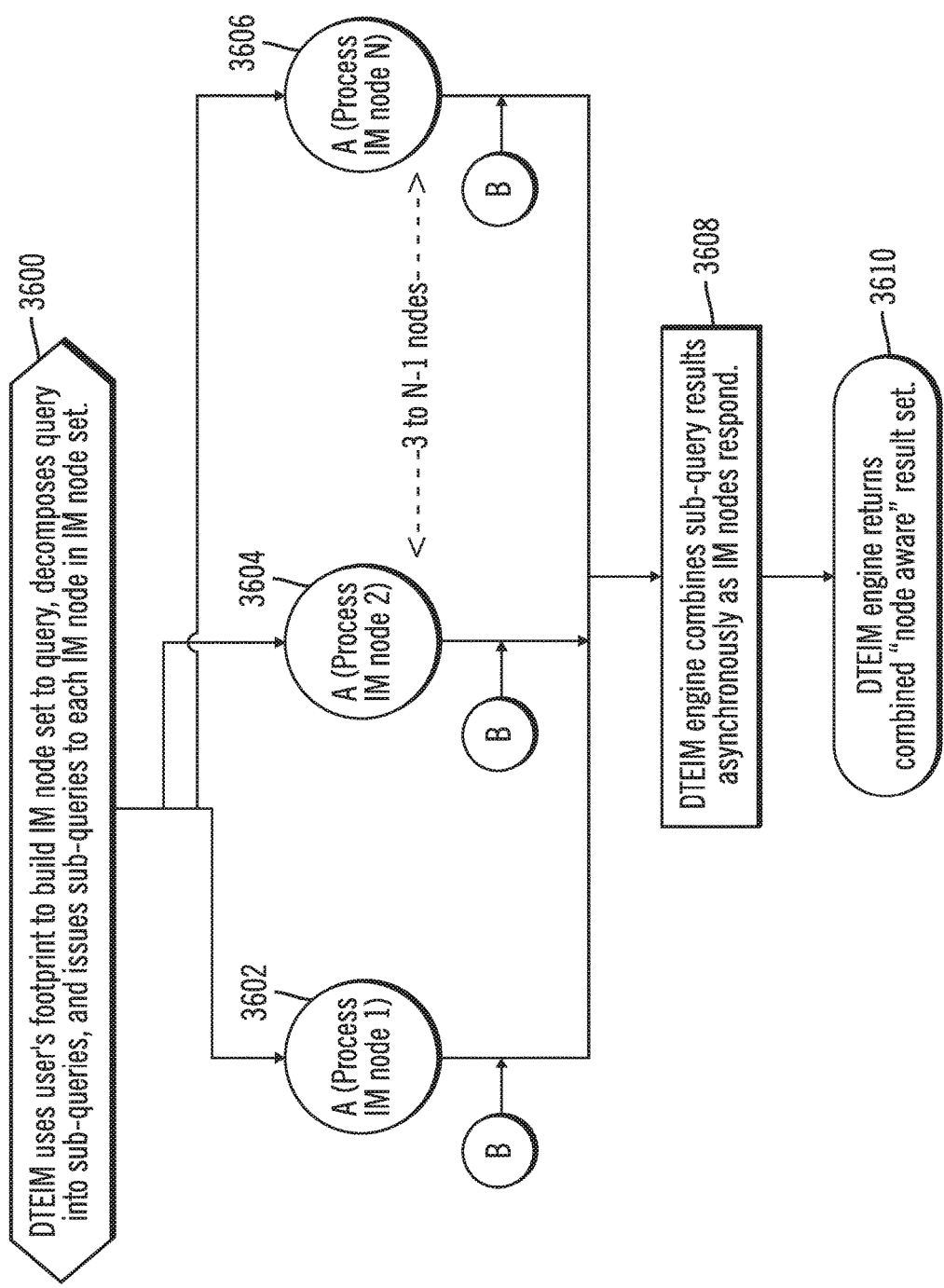

DISTRIBUTED TOPOLOGY ENABLER FOR IDENTITY MANAGER

BACKGROUND

1. Field

Embodiments of the invention relate to a distributed topology enabler for an identity manager that controls user access to different Identity Manager (IM) systems.

2. Description of the Related Art

An Identity Manager (IM) system controls user access to different systems. Systems may be described as "end points" that need user identification (userid) management. Systems may be any combination of computers, computer applications, network devices, human interface devices, appliances, etc.

Implementations for distributed IM nodes typically have requirements that include, for example:
24/7 availability
Millions of users/accounts
Thousands of managed platforms
Distributed administration and management
Distributed maintenance Operationally, these requirements present challenges in conventional IM systems. For example, conventional IM systems have difficulty with the requirements to manage the reconciliation load and scheduling of tens of thousands of services; the need to distribute IM configuration tasks for these services; and the need to provide a rolling schedule for system maintenance activities without bringing down entire IM functionality. Some conventional IM systems may be deployed in a cluster to improve performance and provide failover, but, in very large configurations, the conventional IM systems do not provide maintenance or an upgrade window, or control over reconciliation load management or decentralized administration and maintenance.

Thus, there are drawbacks of existing IM solutions in very large scale implementations. For example, scalability may be reached by adding nodes to a cluster, but this solution may suffer from the bottleneck of a single data repository. Also, an outage or maintenance window may bring down the entire IM infrastructure. Moreover, the configuration tasks are managed and implemented on a single application, putting configuration load at one point.

BRIEF SUMMARY

Provided are a method, computer program product, and system for combining existing identity management information from multiple Identity Manager (IM) nodes. The combined information from the multiple IM nodes is presented. A provisioning request to change the identity management information is received. The provisioning request is decomposed to form multiple, separate sub-requests. One or more IM nodes are identified to process the sub-requests. The sub-requests are issued to the one or more IM nodes in parallel. A status of each of the sub-requests is received from each of the one or more IM nodes that is processing that sub-request. The received statuses are combined. The combined statuses are returned as a status of the provisioning request.

BRIEF DESCRIPTION OF THE SEVERAL VIEWS OF THE DRAWINGS

Referring now to the drawings in which like reference numbers represent corresponding parts throughout:

FIG. 5 illustrates an example DTEIM Administration page in a UI screen in accordance with certain embodiments.

FIG. 9 illustrates selection of a Manage Personal Info menu and a Personal Information tab in a UI screen in accordance with certain embodiments.

FIG. 13 illustrates selection of a Manage Passwords menu in a UI screen in accordance with certain embodiments.

FIG. 14 illustrates a Manage Requests page in a UI screen in accordance with certain embodiments.

FIG. 15 illustrates a Manage To Do Items page in a UI screen in accordance with certain embodiments.

FIG. 16 illustrates a Review Grouped Recertification Request in a UI screen in accordance with certain embodiments.

FIG. 17 illustrates a code snippet that is an example of using the DTEIM API to authenticate in accordance with certain embodiments.

FIG. 18 illustrates a code snippet that is an example of using the DTEIM Data Services API to retrieve account stubs and account data for a user from the DTEIM Directory Access Protocol (LDAP) data store in accordance with certain embodiments.

FIG. 19 illustrates a code snippet that is an example of using the DTEIM Data Services API to retrieve account stubs in accordance with certain embodiments.

FIG. 20 illustrates a code snippet that is an example of updating or creating an account in accordance with certain embodiments.

FIG. 21 illustrates a code snippet that that is an example of retrieving authorized services for a user for an account in accordance with certain embodiments.

FIG. 22 illustrates a code snippet that is an example of getting a populated form for a person in accordance with certain embodiments.

FIG. 23 illustrates a code snippet that is an example of getting password rules in accordance with certain embodiments.

FIG. 24 illustrates a code snippet that is an example for a password change in accordance with certain embodiments.

FIG. 25 illustrates a code snippet that is an example for getting a list of "to do" items from participating IM nodes in accordance with certain embodiments.

FIGS. 27A, 27B, and 27C illustrate schemas in accordance with certain embodiments.

FIG. 29 illustrates an example of a person stub in a user interface in accordance with certain embodiments.

FIG. 31 illustrates a code snippet that is an example for using the web services to authenticate to an IM node and obtain a user's person object in accordance with certain embodiments.

FIG. 35 is formed by FIGS. 35A and 35B.

FIG. 36 is formed by FIGS. 36A and 36B.

FIG. 38 is formed by FIGS. 38A and 38B.

DETAILED DESCRIPTION

In the following description, reference is made to the accompanying drawings which form a part hereof and which illustrate several embodiments of the invention. It is understood that other embodiments may be utilized and structural and operational changes may be made without departing from the scope of the invention.

Embodiments introduce a distributed approach to deploying Identity Manager (IM) nodes. The distributed approach is based on providing a Distributed Topology Enabler for Identity Manager (DTEIM) node (i.e., management node) on top of multiple IM nodes and dividing the service workload across the multiple IM nodes (e.g., hosting hundreds or thousands of services). Embodiments provide a DTEIM node for combined management and views of a user's identity and account information across the enterprise's multiple IM nodes, while decentralizing IM node configuration and administration tasks. The DTEIM node routes user requests to the appropriate IM nodes. Then, the DTEIM node combines information received from different IM nodes and presents this combined information to an end user. In various embodiments, the term "user" may represent a human user, a computer program, a hardware device, etc.

Figure 1:
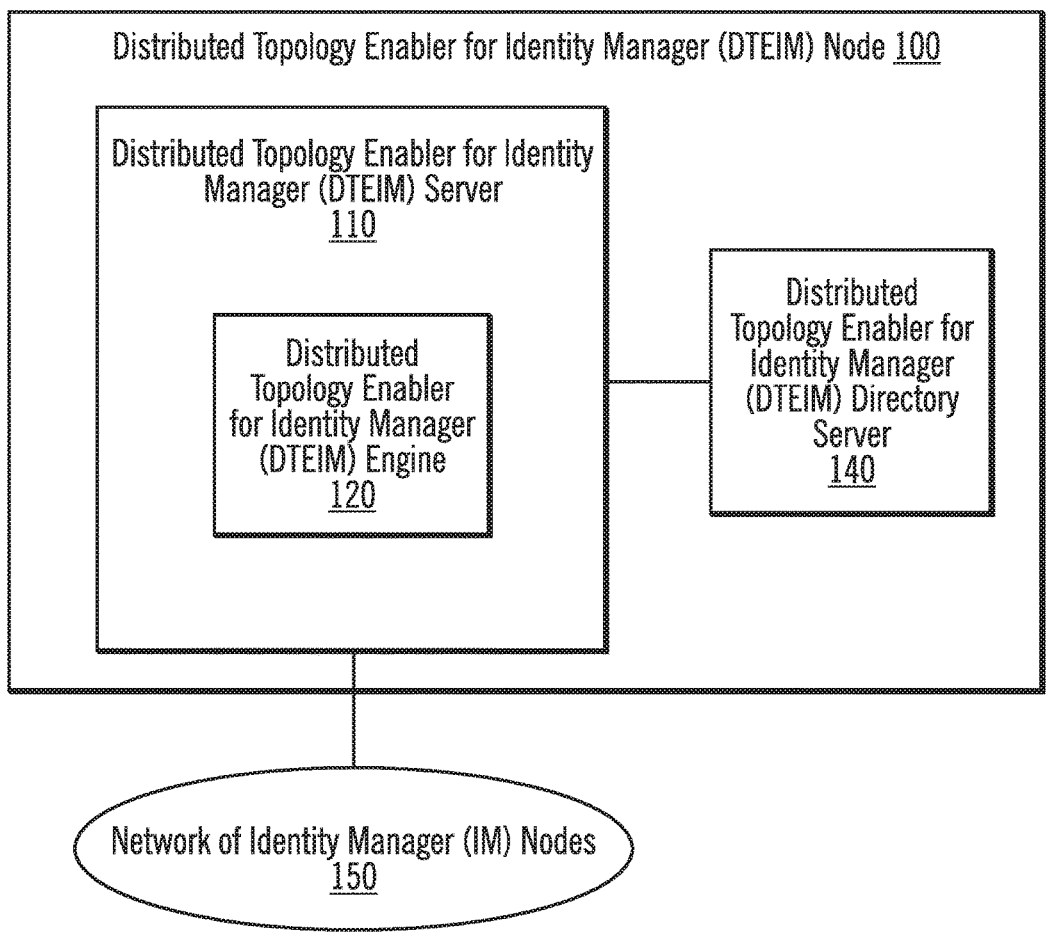
FIG. 1 illustrates a system architecture in accordance with certain embodiments.

FIG. 1 illustrates a system architecture in accordance with certain embodiments. A Distributed Topology Enabler for Identity Manager (DTEIM) node 100 includes a DTEIM server 110 and a DTEIM directory server 140. The DTEIM server 110 includes a DTEIM engine 120. The node 100 is coupled to a network of Identity Manager (IM) nodes 150. In certain embodiments, the IM nodes 150 may sometimes be referred to as IM systems.

In certain embodiments, the term DTEIM architecture refers to the entire, abstract DTEIM infrastructure including DTEIM components. In certain embodiments, the term DTEIM topology refers to the collection of IM nodes 150 under the control of the DTEIM engine 120.

Embodiments provide a progressively scalable solution at very large IM implementations by distributing the identity information and services across multiple IM nodes 150. In certain embodiments, an IM implementation is a reference to the size of an IM solution, including the number of users, services etc. and not to the size of an IM node hardware/software.

In certain embodiments, the use of the DTEIM engine 120 at DTEIM servers (such as at DTEIM server 110) provide the following:

Improved performance by dedicating IM nodes 150 to a subset of services. That is, each IM node 150 hosts a subset of services. Also, each IM node 150 may have a subset of people.

Improved scalability by adding IM nodes 150 as new services are introduced to track additional end points.

Decentralized administration and configuration across multiple IM nodes 150 instead of a monolithic configuration on one IM node 150.

Heterogeneous DTEIM capability that allows different IM nodes 150 to be on different platforms, as well as, different IM versions. The DTEIM engine 120 carries out "version aware" operations on IM nodes 150.

Maintenance and upgrade can be carried on individual IM nodes 150 without shutting down the entire IM infrastructure.

Allows abstraction of the IM. A DTEIM layer on top of the IM layer can be used to service user requests.

Includes a capability to discover IM nodes 150 and services on each IM node 150.

Includes a DTEIM model Application Programming Interface (API) that allows external applications to interface with the DTEIM engine 120.

Uses web services based communication between the DTEIM engine 120 and an IM node 150.

Provides end user based functionality on the DTEIM engine 120. Administrator functionality is decentralized and performed on the IM node 150.

With the DTEIM engine 120, there is a distributed IM architecture to provide a progressively scalable solution to a very large user and service base. In certain embodiments, the DTEIM topology consists of loosely coupled IM nodes 150, accessed via a DTEIM server 110. In certain embodiments, the DTEIM engine 120 may be a JAVA® 2 Platform, Enterprise Edition (J2EE®) application that functionally behaves as a combined reverse proxy server plus information and response combiner. The DTEIM engine 120 distributes (e.g., sprays) user requests to one of many IM member nodes based on the one or more target services and combines identity manager information and responses from multiple IM nodes to the end user. (JAVA and J2EE are trademarks of Sun Microsystems in the United States, other countries, or both.)

The DTEIM engine 120 provides the DTEIM services and provides an API implementation. The API combines user information from different IM nodes 150, communicates with IM nodes 150 using a web services interface, discovers services in IM nodes 150, maintains service to an IM node mapping, provides functionality similar to IM self services capability, and utilizes the local DTEIM server to derive node, person and account relationships.

The DTEIM engine 120 combines responses from different IMs to present to the end user. The DTEIM engine 120 also hosts a Distributed IM API (DTEIM API) module, which can be used by external web applications to provide a custom User Interface (UI) or be called by a JAVA® client. Below, a DTEIM User Interface (UI) web application is provided to illustrate DTEIM capabilities and API usage and can be used as a base to set up a custom UI.

In certain embodiments, the DTEIM architecture:
Lets individual IM nodes 150 be designated for a subset of services, thus spreading the load based on a service boundary.
Allows a heterogeneous mix of IM platforms, so that IM nodes 150 could be deployed on various operating systems (e.g., a WINDOWS® operating system, a UNIX operating system, a LINUX® operating system, or any mix of these). (WINDOWS is a trademark of Microsoft Corporation in the United States, other countries, or both. UNIX is a trademark of The Open Group in the United States, other countries, or both. LINUX is a trademark of Linus Torvalds in the United States, other countries, or both.) That is, IM nodes 150 may be heterogeneous across platforms and IM versions.
Allows a heterogeneous mix of IM versions and is aware of each IM node's 150 version to determine node capabilities.
Allows a staggered or "rolling" upgrade and maintenance capability so that individual IM nodes 150 can be upgraded or patched without affecting entire IM functionality.
Discovers services on newly defined IM nodes 150.
Allows progressive scaling using a distributed services model so that new IM nodes can be added to the DTEIM architecture as new services are deployed. The first IM node 150 can be migrated into the DTEIM architecture. Also, a migration tool is provided for this.
Decentralizes administration with separate administrators to configure subsets of services on each IM node 150, in terms of service definitions and policies.
Maintains some common information across all IM nodes 150.
Leverages an IM-IM adapter to distribute person objects to participating IM nodes 150.

Since the DTEIM topology consists of loosely coupled IM nodes 150 that are administered independently, the DTEIM topology allows IM objects that are local to an individual IM node 150 to be configured and managed at the IM node 150 itself, instead of burdening the DTEIM topology. The focus of the DTEIM server 110 is to provide end user services across the DTEIM architecture using the DTEIM engine 120. The DTEIM architecture provides a high degree of decentralization, while the end users get a unified view of the distributed services across multiple IM nodes 150.

The DTEIM architecture also allows IM nodes 150 to have different person populations, and the DTEIM architecture keeps track of a user's footprint across IM nodes 150 (e.g., which IM nodes 150 that the user participates in).

DTEIM Architecture

The DTEIM architecture consists of a "global" DTEIM management node (a DTEIM server and DTEIM directory server) that interacts with one or more independent IM member nodes. The DTEIM management node combines identity management data from multiple IM nodes 150 to present to users, receives requests from users, and routes requests to the one or more member IM nodes 150 that are responsible for the request's target. Each of the member IM nodes 150 can be fully clustered IM nodes 150 that are responsible for a subset of services that the distributed system will manage. The DTEIM UI application can also be clustered to offer high throughput and provide failover. The DTEIM node 100 provides the capabilities to manage IM node information, route requests, combine results, and present an API for user interface development. In certain embodiments, the DTEIM node 100 uses a local Lightweight Directory Access Protocol (LDAP) data store or LDAP directory server to hold configuration information and object stubs of entity objects that point to the distributed locations of these entity objects. The object stubs may be for people (i.e., people stubs), accounts (i.e., account stubs), services (i.e., service stubs), etc. Each object stub points to a complete entity object (for the people, accounts, services, etc.) stored at an IM node 150.

One of the IM nodes 150 is designated as the main "people" node. Identity/Human Resource (HR) feeds may be input into this main "people" node, bypassing the DTEIM node 100. The IM-IM adapter is leveraged to distribute person objects from the main IM node 150 to other IM nodes 150 via policy configuration. That is, each IM node 150 gets an identity feed from the main IM node 150 via the IM-IM adapters. Each child IM node 150 appears as a managed platform in the main IM node 150. The IM policies and automatic entitlements may be configured to distribute person objects to the child IM nodes based on person criteria. In certain embodiments, the IM-IM adapter uses a standard adapter framework.

In certain embodiments, the DTEIM node communicates with the IM nodes by using a web services based abstraction of the IM API. For example, the DTEIM node routes user requests to the appropriate IM node over the web services interface. The DTEIM distribution contains an IM web services connector that is installed in front of each IM node. This removes IM API and web services version dependency when communicating with the IM nodes and provides a lightweight and standard communication HyperText Transfer Protocol (HTTP) based protocol instead of other protocols (e.g., the JAVA® Remote Method Invocation (RMI) interface over the Internet Inter-Orb Protocol (IIOP) (also referred to as RMI over IIOP) used by the IM API).

Person and account changes that occur on the IM nodes independently or as a result of operations initiated from the DTEIM node are notified back to the DTEIM node via a DTEIM notifier module that is installed on the IM nodes as part of the DTEIM infrastructure. The DTEIM notifier modules use web services based communication to communicate from an IM node to the DTEIM node.

Figure 2:
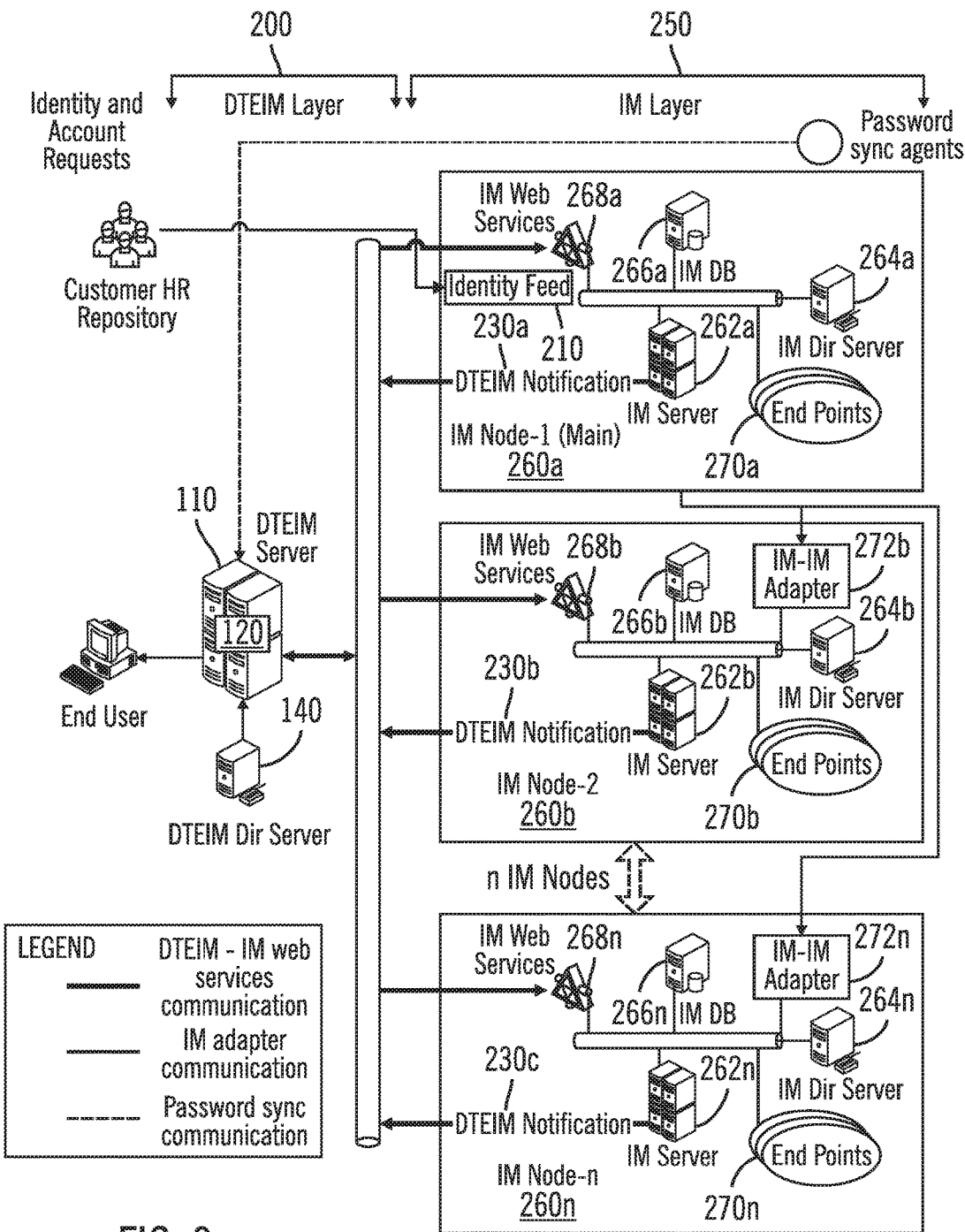
FIG. 2 illustrates a Distributed Topology Enabler for Identity Manager (DTEIM) architecture in accordance with certain embodiments.

FIG. 2 illustrates a DTEIM architecture in accordance with certain embodiments. In FIG. 2, the architectural components of the DTEIM architecture consist of a DTEIM server 110 and a DTEIM directory server 140 at a DTEIM layer 200 and a DTEIM notifier module 230a, 230b, . . . 230n at each IM node 260a, 260b, . . . 260n, respectively, of an IM layer 250. A DTEIM listener at the DTEIM server 110 listens for notifications from each DTEIM notifier module 230a, 230b, . . . 230n. In the example of FIG. 2, the DTEIM layer consists of a DTEIM engine 120 executing at the DTEIM server 110. In certain embodiments, the DTEIM engine 120 is a J2EE® application, and the DTEIM directory server 140 is an LDAP data store or LDAP directory server. The DTEIM LDAP data store contains object stubs for services and account objects for all services and accounts across the DTEIM nodes. The LDAP data store also contains an object stub pointing to the person object on the main IM node 260a. The DTEIM LDAP data store is a staging repository of object stubs for lookup. The DTEIM configuration and IM topology are also stored in the LDAP data store.

The DTEIM engine 120 retrieves person information from the main IM node 260a (following a stub reference). Then, changes are written back to the main IM node 260a, which distributes the changes to participating IM nodes 260b . . . 260n via IM-IM adapters 272b . . . 272n. The DTEIM engine 120 retrieves and updates account objects by following the account stub reference. The DTEIM engine 120 retrieves other objects from participating IM nodes 260a, 260b, . . . 260n in parallel. Thus, the time to retrieve objects is as long as the longest time to retrieve from any single IM. The main IM node 260a may host an identity repository and optionally a subset of services. The identity repository stores a collection of person entities.

The IM layer 250 consists of one or more IM nodes 260a, 260b, . . . 260n. The IM nodes 260a, 260b, . . . 260n may be geographically separate. Each IM node 260a, 260b, . . . 260n includes, respectively, an IM server 262a, 262b, . . . 262n, an IM directory server 264a, 264b, . . . 264n, an IM database 266a, 266b, . . . 266n, IM web services 268a, 268b . . . 268n, and end points 270a, 270b, . . . 270n.

One of the IM nodes 260a is designated the main IM node and maintains all identities in an IM database 266a (or other data store). Identity feeds are carried out on the main IM node 260a via the identity feed 210.

Each of the other IM nodes 260b . . . 260n includes an IM-IM adapter 272b . . . 272n.

The DTEIM notifier 230a, 230b, 230c is a workflow proxy module and is installed into each IM node 260a, 260b, . . . 260n, respectfully, to notify the DTEIM engine 120 about person and account object creation or deletion. This notification may be sent via the IM web services 268a, 268b . . . 268n.

Each IM node 260a, 260b, . . . 206n notifies the DTEIM engine 120 of account and person changes via the notifier module using a web services interface. For example, adds and deletes of entity objects are notified. In certain embodiments, attribute changes, other than suspend/restore, are not notified.

The IM web services may be described as a web services wrapper for the IM API. The DTEIM architecture leverages the IM API web services wrapper of the web services 264a, 264b, . . . 264c to communicate with the IM nodes 260a, 260b, . . . 260n, and the standard IM-IM adapter 272b . . . 272n to distribute person information across the IM nodes 260a, 260b, . . . 260n.

In FIG. 2, the DTEIM engine 120 manages the IM nodes 260a, 260b, . . . 260n. Node-1 260a is the main IM node and manages a subset of services. Node-2 260b and Node-n 260n are IM nodes that manage their respective subsets of services.

Each IM node 260a, 260b, . . . 260n has IM web services 268a, 268b, . . . 268n that listen for calls by the DTEIM engine 120 against the IM platform. In certain embodiments, the DTEIM engine 120 talks to the IM web services 268a, 268b, . . . 268n over standard HyperText Transfer Protocol Secure (HTTP/S) or Simple Object Access Protocol (SOAP) over HTTPS. The IM web services 268a, 268b, . . . 268n may internally use an IM API to service the call and send back a web service response. Also, non-JAVA® clients (e.g., .net clients) are able to communicate with the IM nodes 260a, 260b, . . . 260n. The IM API complexity is abstracted by the web services functional API.

Master-Child or Peer to Peer

The DTEIM topology can be configured as either a Master Child topology or a Peer to Peer topology.

In the Peer to Peer topology, each IM node has independent identity feeds from authoritative sources. Common persons in different IM nodes have the same unique, one or more identifying attributes.

FIG. 2 illustrates the Master-Child topology. In the Master Child topology, one of the IM nodes 260a is designated as the main (i.e., master) IM node and all people in the enterprise are populated in the main IM node via an identity feed 210 (e.g., from an authoritative source). In certain embodiments, people on the main IM node 260a are provisioned to the other IM nodes 260b . . . 260n via the IM-IM adapters 272b . . . 272n via role assignment in the main IM node 260a or a manual request.

In a Master Child topology, the DTEIM engine 120 assumes that each IM node 260a, 260b, . . . 260n uses a common authentication provider so that a user can be authenticated on any of the IM nodes 260a, 260b, . . . 260n with the same credential. This type of authentication is typically achieved by using an external authentication repository, such as an enterprise directory. In certain alternative embodiments, the DTEIM engine 120 and IM nodes may leverage an access control product that provides Single Sign On (SSO) capabilities, and authentication may be delegated to the access control product.

End users log onto the DTEIM engine 120 using the same authentication that they would have used for an IM node 260a, 260b, . . . 260n (e.g., simple authentication, Single Sign On (SSO), client certificate authentication, etc.). The DTEIM engine 120 authenticates (or establishes a session) against the main IM node 260a. In certain embodiments, the end user has an IM account on the main IM node 260a and on any other IM node 260b, . . . 260n where the user wants to manage accounts.

Person Modification

Person modification requests by the end user are serviced by the DTEIM engine 120 from the main IM node 260a. After they are executed there, the IM-IM adapters 272b . . . 272n framework distributes (e.g., sprays) the changes to affected IM nodes 260a, 260b, . . . 260n. If a person is added or removed from an IM node 260a, 260b, . . . 260n, the DTEIM notifier module 230a, 230b, . . . 230n on that IM node 260a, 260b, . . . 260n notifies the DTEIM engine 120, and the DTEIM engine 120 adds or removes the object stub that references the person's object on the IM node 260a, 260b, . . . 260n from the directory server 140.

In certain embodiments, there is person modification only on a specific IM node 260a, 260b, . . . 260n. For such embodiments, using the IM-IM adapter 272b . . . 272n, each IM node 260a, 260b, . . . 260n is represented as a service on the main IM node 260a. A user's person object on an IM node 260a, 260b, . . . 260n is represented as an identity account. Using the DTEIM engine 120, a user is able to manage this account by choosing an identity account from any IM node.

Account and Password Management

The DTEIM engine 120 maintains object stubs for all accounts owned by a person. The DTEIM notifier 230a, 230b, . . . 230n on an IM node 260a, 260b, . . . 260n sends account object creation and deletion notifications to the DTEIM engine 120. The DTEIM engine 120 lets a user manage accounts on all IM nodes 260a, 260b, . . . 260n or selectively on one IM node 260a, 260b, . . . 260n at a time.

When a provisioning request on one or more services is submitted to the DTEIM engine 120, the DTEIM engine 120 determines the IM node 260a, 260b, . . . 260n that manages the service and routes the account request to the IM node 260a, 260b, . . . 260n responsible for the service. In certain embodiments, a service may be described as representing an "end point" (i.e., a system managed by the IM node). After the request is executed there, the DTEIM notifier module 230a, 230b, . . . 230n sends notification to the DTEIM engine 120, which creates an account stub in the DTEIM directory server 140. In certain embodiments, simple attributes changes on account objects in IM nodes 260a, 260b, . . . 260n are not sent back to the DTEIM object stub on the DTEIM directory server 140, and, thus, they do not add to the DTEIM-IM traffic.

When a user wants to view or modify existing accounts, the DTEIM engine 120 expands the account stub (by accessing the IM node 260a, 260b, . . . 260n) to render account information to the end user.

The DTEIM engine 120 distributes (e.g., sprays) password change requests to the target IM nodes 260a, 260b, . . . 260n in parallel. For the user's convenience, the DTEIM engine 120 joins the password rules across the IM nodes 260a, 260b, . . . 260n if the target accounts in the password change request are on multiple IM nodes 260a, 260b, . . . 260n.

Access information is retrieved from participating IM nodes 260a, 260b, . . . 260n in parallel. Accesses can be retrieved, provisioned or removed.

Request and Assignment Management

The DTEIM engine 120 gets request information or assignment information in parallel from all the IM nodes 260a, 260b, . . . 260n that a user participates in. In certain embodiments, the DTEIM engine 120 does not connect to the IM nodes 260a, 260b, . . . 260n that the user does not participate in. Since the requests or assignments from multiple IM nodes 260a, 260b, . . . 260n are retrieved in parallel, the time to retrieve is only as long as the longest time to retrieve from any one IM node 260a, 260b, . . . 260n (plus a minor thread management overhead). Also, assignment items can be performed in bulk across IM nodes 260a, 260b, . . . 260n in a single action. Assignment items may be described as "to do" items for a participant (e.g., pending approve/reject items for provisioning requests for another user, pending requests to provide more information on a provisioning request, etc.).

IM Node Administration

In certain embodiments, since the DTEIM architecture allows for a very loose coupling of IM nodes, no policies, roles or other configuration items are defined or configured at the DTEIM layer 200. IM administrators (e.g., system administrators or other users) configure the IM nodes 260a, 260b, . . . 260n using current capabilities of identify management. In certain embodiments, most of the configuration steps may be carried out as they would be for any IM node. This configuration includes:

Password challenge configuration. This is configured on the main IM node 260a in the Master-Child topology.

Person workflow customization is configured on the main IM node 260a. Person workflow customization can optionally be configured on other IM nodes 260b . . . 260n, if a custom operations workflow is needed on that IM node 260b . . . 260n that accesses objects local to that IM node 260b . . . 260n.

Service profiles are installed on IM nodes 260a, 260b, . . . 260n that will host services for them.

Provisioning policies are defined on the IM node 260a, 260b, . . . 260n that hosts the target service. In certain embodiments, provisioning policies do not target services not hosted on that IM node 260a, 260b, . . . 260n. In certain embodiments, separate provisioning policies may be configured on the separate IM nodes 260a, 260b, . . . 260n. In certain embodiments, Service Selection policy targets are on the same IM node 260a, 260b, . . . 260n.

The IM account (i.e., a System User object) is provisioned on the main IM node 260a, and on all the IM nodes 260b . . . 260n that the users need to manage.

Entitlement workflow is defined on the IM node 260a, 260b, . . . 260n that holds the provisioning policy that targets the entitlement. Entitlement may be described as a person's authorization to have a userid on an end point. An entitlement workflow is run when a person requests a userid to be created or modified on an end point when that person is authorized to get a userid on the end point.

Password and identity policies are defined on the IM node 260a, 260b, . . . 260n that hosts the target service. If a global (all services) password or identity policy is needed, the global password is defined on the main IM node 260a and also on other IM nodes 260b . . . 260n. A DTEIM administration function replicates the global password and identity policies to all IM nodes 260a, 260b, . . . 260n.

Password editing and password synchronization capabilities are defined identically across the IM nodes 260a, 260b, . . . 260n since the DTEIM engine 120 needs them before dispatching provisioning requests to the IM nodes 260a, 260b, . . . 260n.

Password intercept agents may be supported at the DTEIM layer 200. This functionality is useful for password synchronization.

DTEIM Architecture Additional Details

The DTEIM engine 120 provides end user functionality. In certain embodiments, for decentralization, administrative and configuration tasks are performed on the IM nodes 260a, 260b, . . . 260n. In certain embodiments, post office consolidation of notifications take place within the IM nodes 260a, 260b, . . . 260n. A post office may be described as an email notice consolidation facility to combine frequent multiple email notifications to the same user into one to reduce email traffic. The post office consolidation may be a feature of the IM node and is not directly impacted by DTEIM engine 120. In certain embodiments, provisioning policies do not target services that are in different IM nodes 260a, 260b, . . . 260n, and a separate provisioning policy is configured in each IM node 260a, 260b, . . . 260n.

In certain embodiments, password and identity policies do not target service profiles if all service instances are not in the same IM node 260a, 260b, . . . 260n. In certain alternative embodiments, the password and identity policies do target service profiles if all service instances are not in the same IM node 260a, 260b, . . . 260n, and the policies are identical on each IM node 260a, 260b, . . . 260n to avoid confusion over conflicting policies.

In certain embodiments, person Access Control Items (ACIs) that involve an account relation are setup on the IM node 260a, 260b, . . . 260n that hosts the service for the account. An ACI controls who has how much access to IM data. In some embodiments in which data is referenced from multiple accounts that are not on the same node, the person ACI filter option is not used.

In certain embodiments, a custom workflow does not use operation activities to reference services not hosted on that IM node 260a, 260b, . . . 260n. The custom workflow is created on the one or more IM nodes 260a, 260b, . . . 260n that host the services and related objects. In certain embodiments, services may list as prerequisites other services in the same node.

DTEIM Reference User Interface (UI)

The DTEIM reference UI is an end user UI. The DTEIM reference UI provides self service user functions (i.e., the administration tasks are decentralized on the local IM nodes). The DTEIM reference UI is provided with the DTEIM engine 120 to show the DTEIM functionality. In certain embodiments, the DTEIM reference UI is a reference implementation of the DTEIM API. The DTEIM reference UI illustrates the use of the DTEIM API. In various embodiments, other UIs can be written against the DTEIM API or the DTEIM reference UI can be used as a base to deliver a UI as per the requirements of an organization.

In certain embodiments, the DTEIM reference UI uses JAVA® Server Faces (JSF) for view processing and uses the DTEIM API to communicate with the IM nodes. The DTEIM reference UI includes source code and JAVA® documentation that can be used to customize the DTEIM reference UI.

The DTEIM reference UI functionality is based on the functionality that an end user would see in the IM UI. Since the DTEIM engine 120 is scoped for end user functions, the DTEIM reference UI does not contain administrative functions. In the DTEIM architecture, administrative functions are decentralized and performed directly on the IM node by the administrator.

After installation, the DTEIM reference UI can be accessed by navigating to a particular location or Uniform Resource Locator (URL) (e.g. http://hostName: portNumber/DTEIM/index.html).

The following screen shots show some of the DTEIM Reference UI screens.

Figure 3:
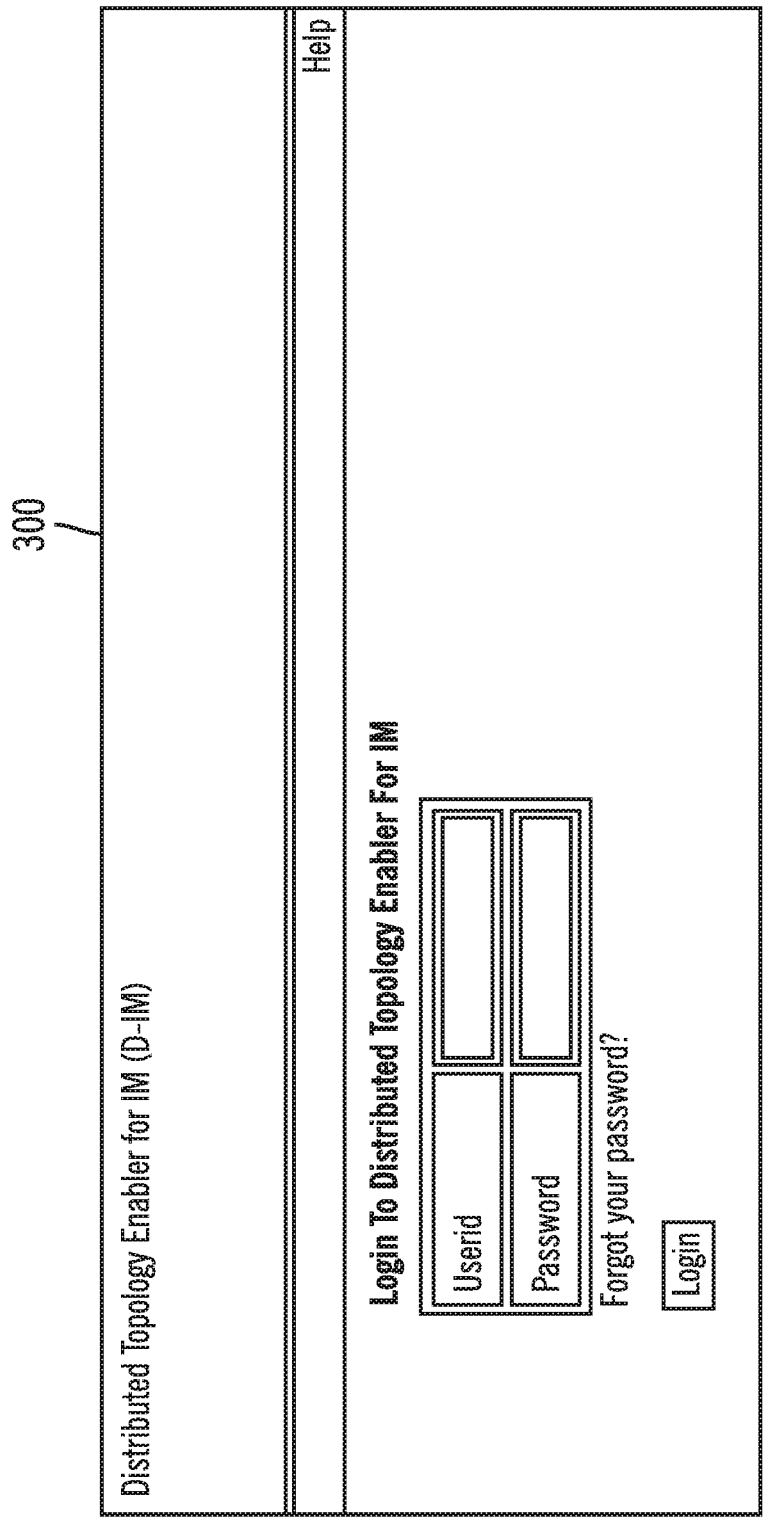
FIG. 3 illustrates an example DTEIM login screen in accordance with certain embodiments.

FIG. 3 illustrates an example DTEIM login screen 300 in accordance with certain embodiments. The login function authenticates the user against the Main IM node. Password challenges are also authenticated against the Main IM node. The authentication may use, for example, simple authentication, Single Sign On (SSO), client certificate authentication, etc.

Figure 4:
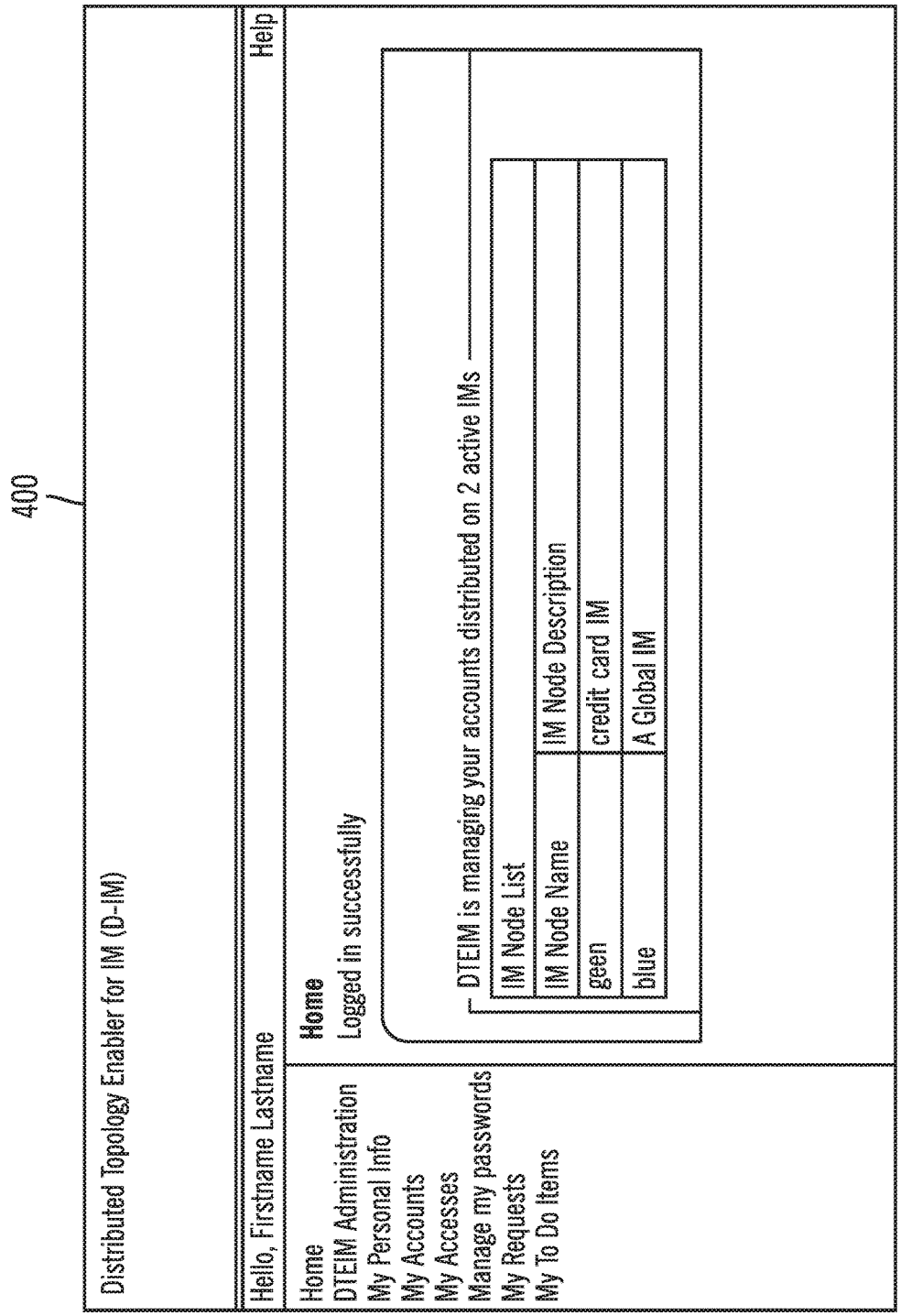
FIG. 4 illustrates an example DTEIM Home page in a User Interface (UT) screen in accordance with certain embodiments.

FIG. 4 illustrates an example DTEIM Home page in a UI screen 400 in accordance with certain embodiments. The DTEIM Home page shows a summary of the user's IM activities and accounts. The footprint of the logged in user is shown. In certain embodiments, a user may have presence on one or more IM nodes. The DTEIM Home page shows accounts and pending items.

FIG. 5 illustrates an example DTEIM Administration page in a UI screen 500 in accordance with certain embodiments. The DTEIM Administration page lists all the IM nodes participating in the distributed topology. An IM node can be set to inactive, and the DTEIM engine 120 will exclude that IM node from IM operations or defer operations until that IM node is reactivated. The DTEIM Administration page allows configuration of a list of nodes. One or more nodes may be inactivated for maintenance (e.g., the red node is inactive, and the "Test" button for the red node is not available for selection).

Figure 6:
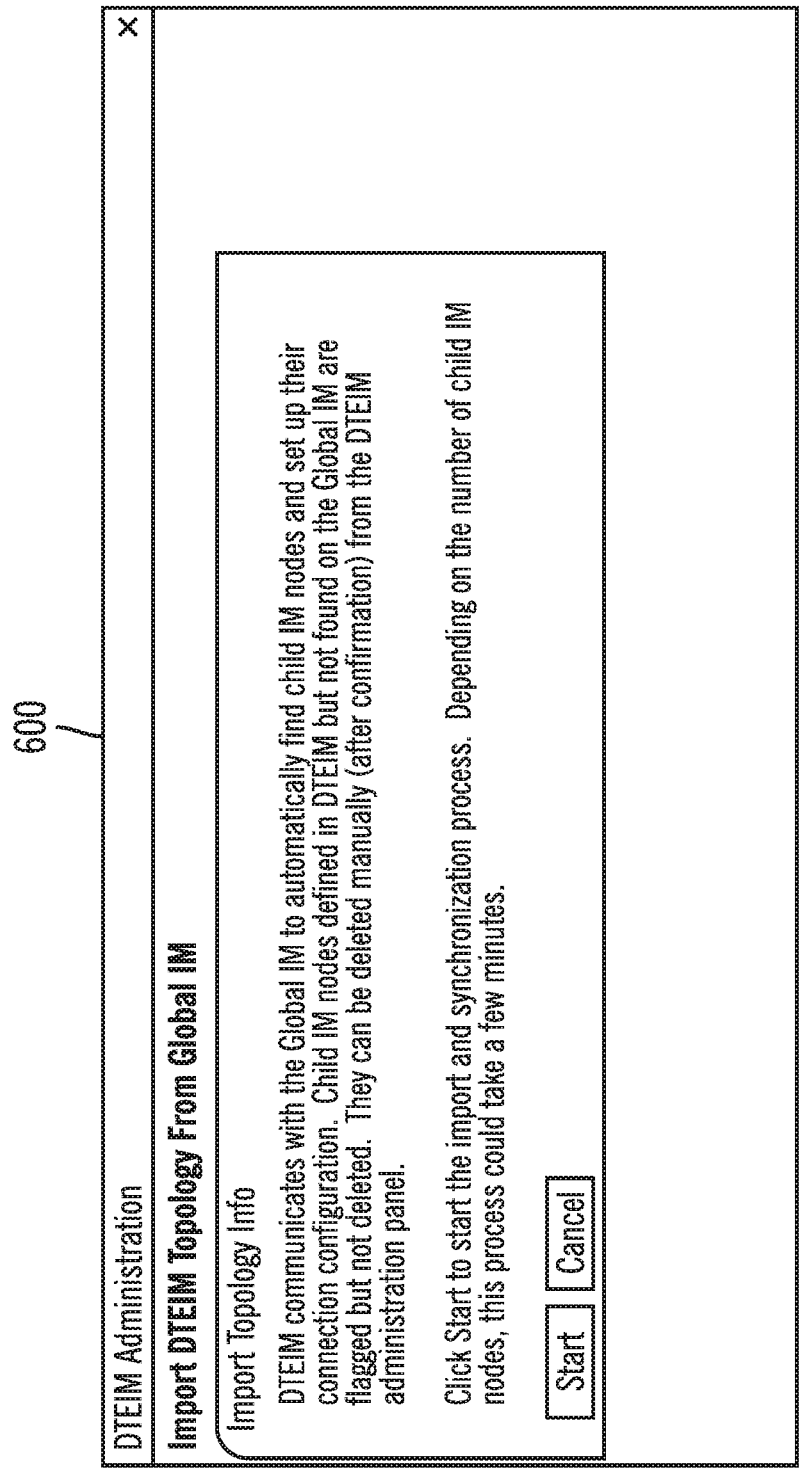
FIG. 6 illustrates selection of the "Import Topology From Global IM" function in a UI screen in accordance with certain embodiments.

FIG. 6 illustrates selection of the "Import Topology From Global IM" function in a UI screen 600 in accordance with certain embodiments. The "Import Topology From Global IM" function automatically imports the entire DTEIM topology from the main IM node. (DTEIM uses the service instances of the IM-IM adapter profile and imports them as IM nodes in DTEIM). The Interrogate Node function interrogates the node's IM services and the IM version and fixpack level. Object stubs of the services are stored in the DTEIM LDAP data store. The IM version level determines subsequent functions available to be carried out on the node.

Figure 7:
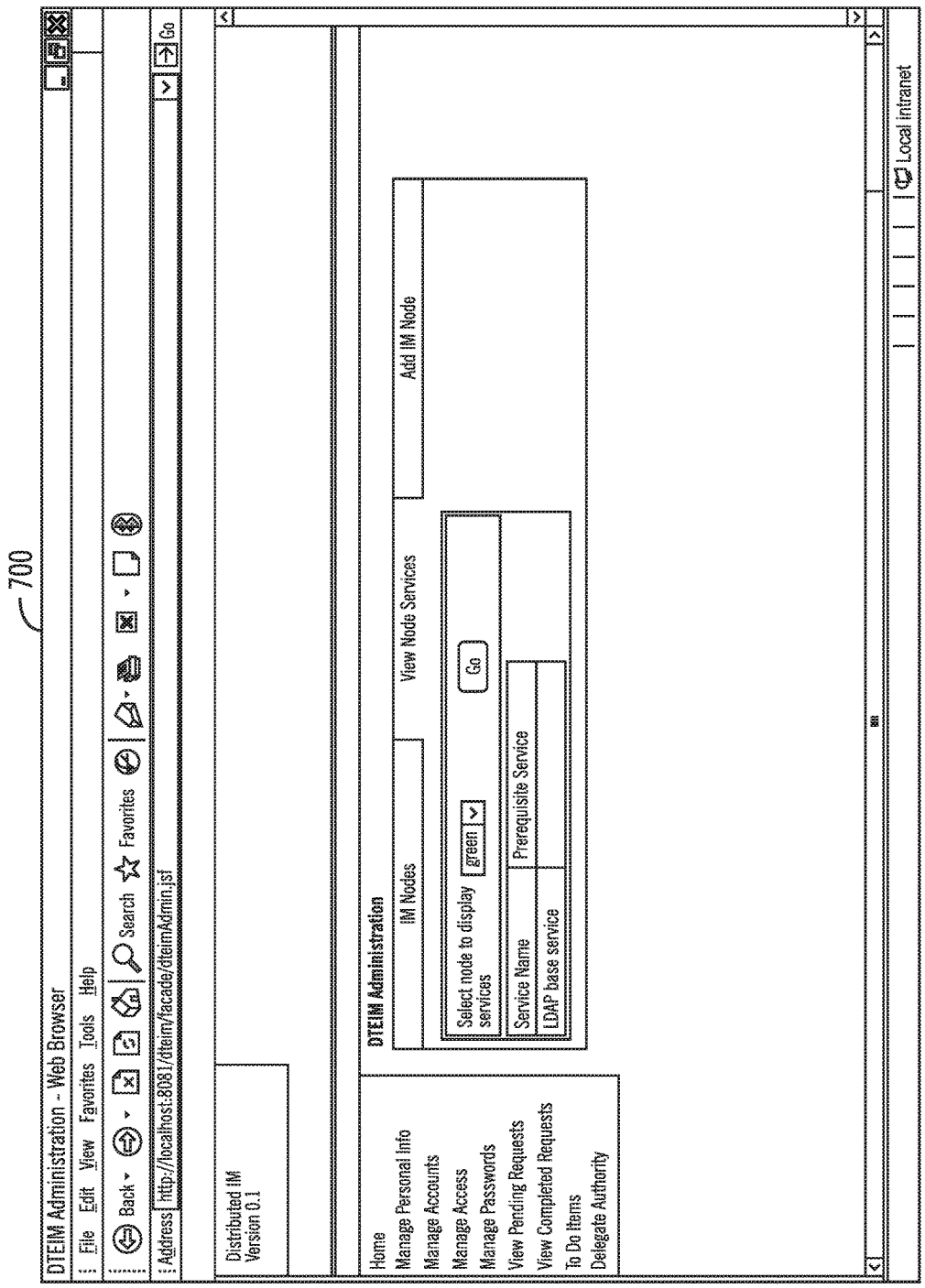
FIG. 7 illustrates selection of a View Node Services tab in a UI screen in accordance with certain embodiments.

FIG. 7 illustrates selection of a View Node Services tab in a UI screen 700 in accordance with certain embodiments. The View Node Services tab shows services on any of the IM nodes (recognized by the DTEIM engine 120 by interrogating each IM node via the Interrogate IM Node function). The View Node Services tab shows the services available on an IM node. The DTEIM engine 120 has a local data store that the DTEIM engine 120 populates with an IM node's services during the Interrogate IM Node operation.

Figure 8:
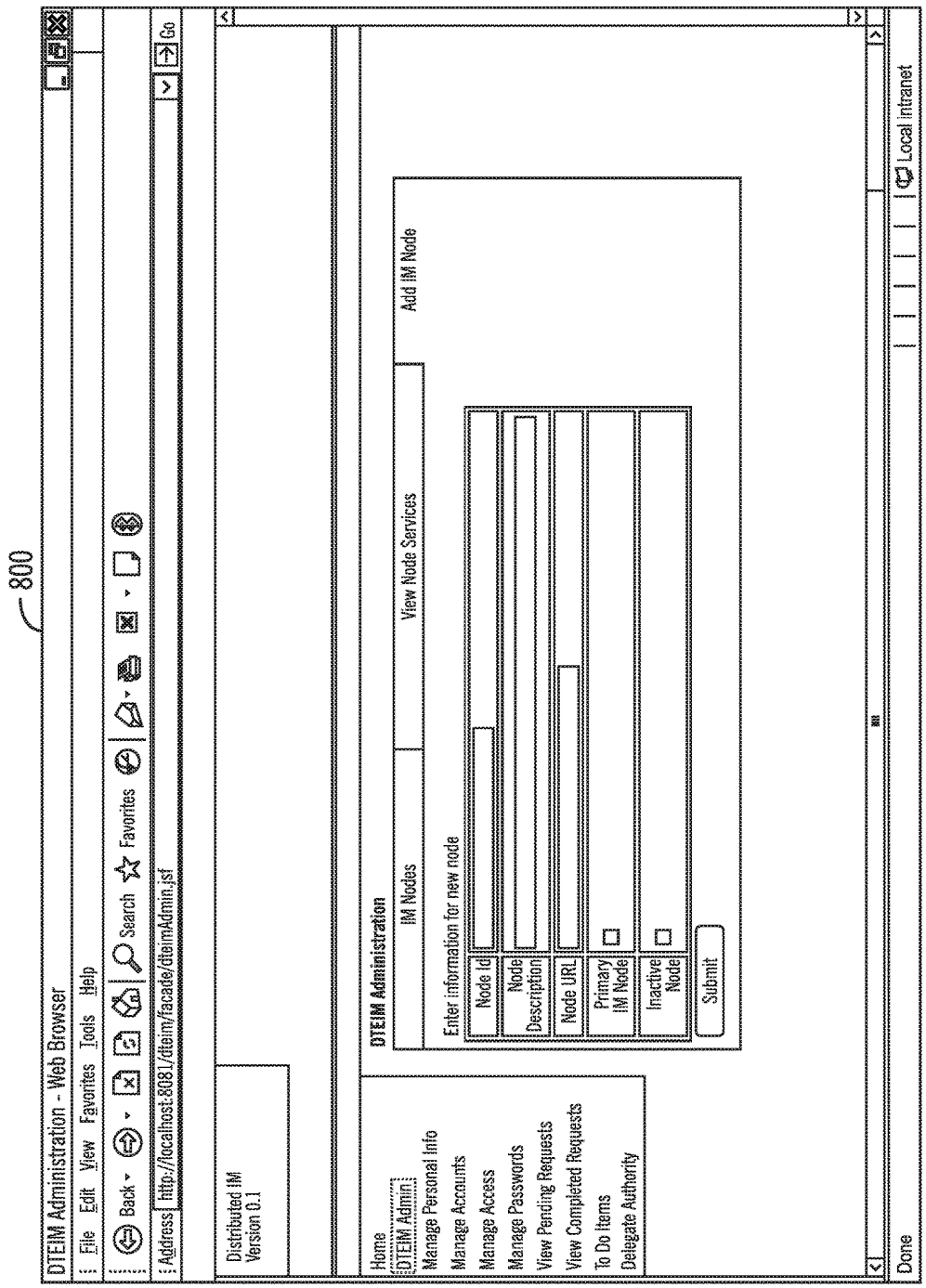
FIG. 8 illustrates selection of a DTEIM Admin menu and an add IM Node tab in a UI screen in accordance with certain embodiments.

FIG. 8 illustrates selection of a DTEIM Admin menu and an add IM Node tab in a UI screen 800 in accordance with certain embodiments. In some of the figures, an option that is selected is shown in dotted lines (e.g., DTEIM Admin in FIG. 8). The Add IM Node tab allows the addition of a new IM node to the DTEIM configuration manually. In certain embodiments, the IM software is installed on the IM node before the IM node is added to the DTEIM architecture. Adding a new IM node may involve installation of DTEIM node artifacts (i.e., the notifier module and the IM-IM adapter).

Figure 9:
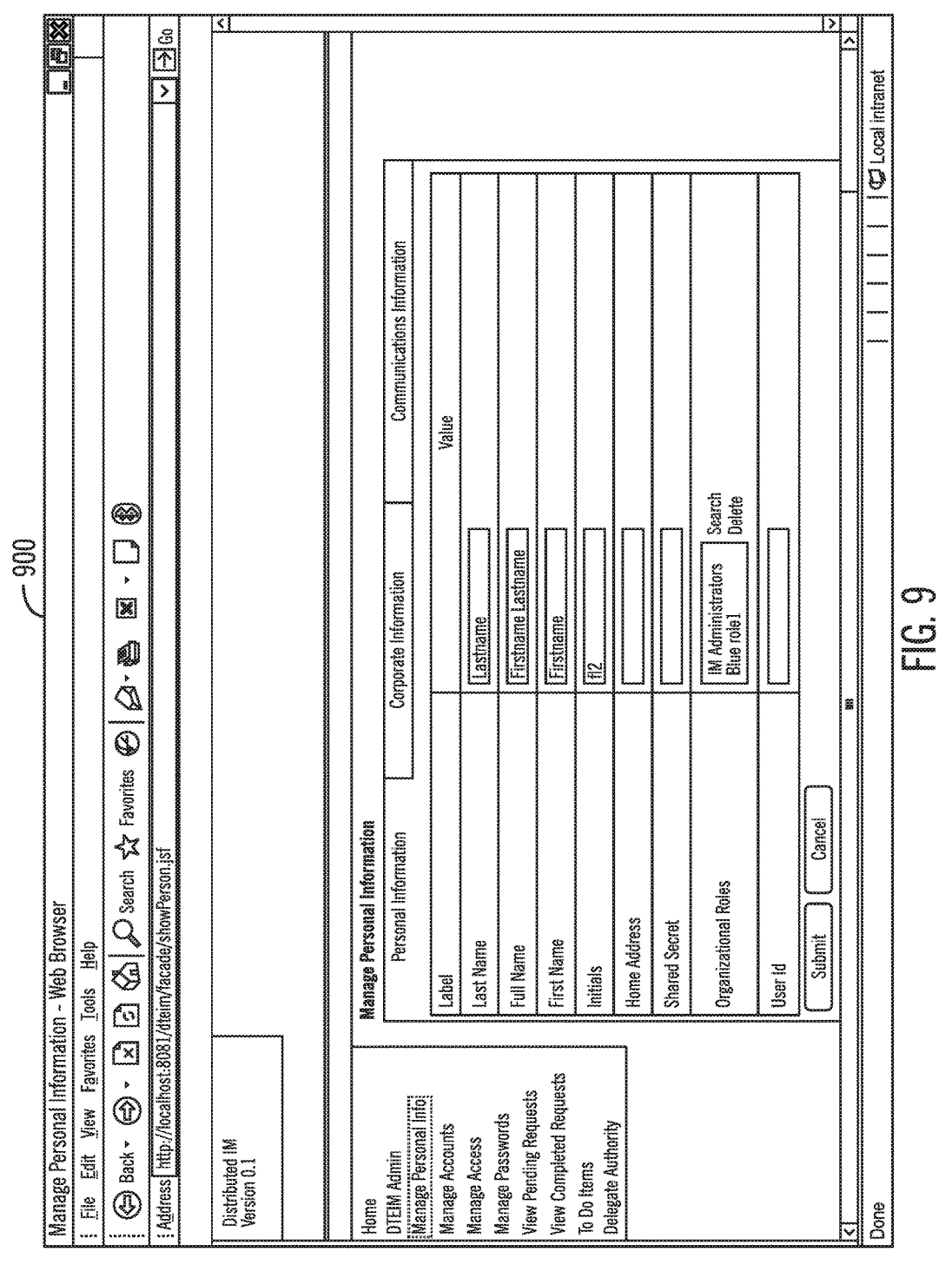

FIG. 9 illustrates selection of a Manage Personal Info menu and a Personal Information tab in a UI screen 900 in accordance with certain embodiments. The Manage Personal Information menu retrieves person information from the Main IM node. The DTEIM engine 120 displays the person information similar to the IM UI. Person form changes in IM are followed in real time by the DTEIM engine 120. The Personal Information tab may be rendered using an IM form definition.

Figure 10:
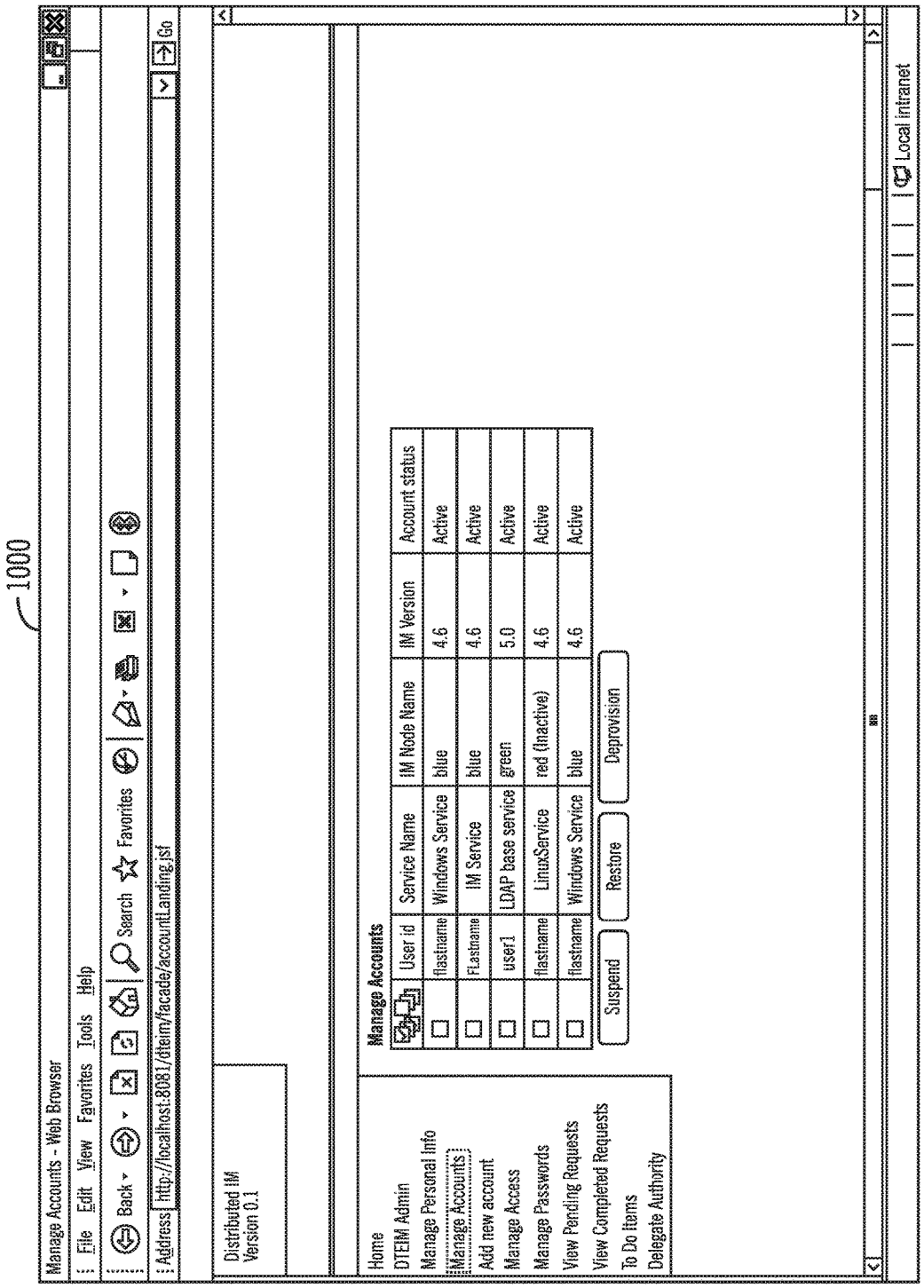
FIG. 10 illustrates selection of a Manage Accounts menu in a UI screen in accordance with certain embodiments.

FIG. 10 illustrates selection of a Manage Accounts menu in a UI screen 1000 in accordance with certain embodiments. The Manage Accounts screen combines all accounts across all the IM nodes and shows them to the end user. If a user holds an account on an IM node which is down (inactive) the account is listed, but is either excluded or deferred from IM operations. Accounts may be selected from one or more IM nodes.

Figure 11:
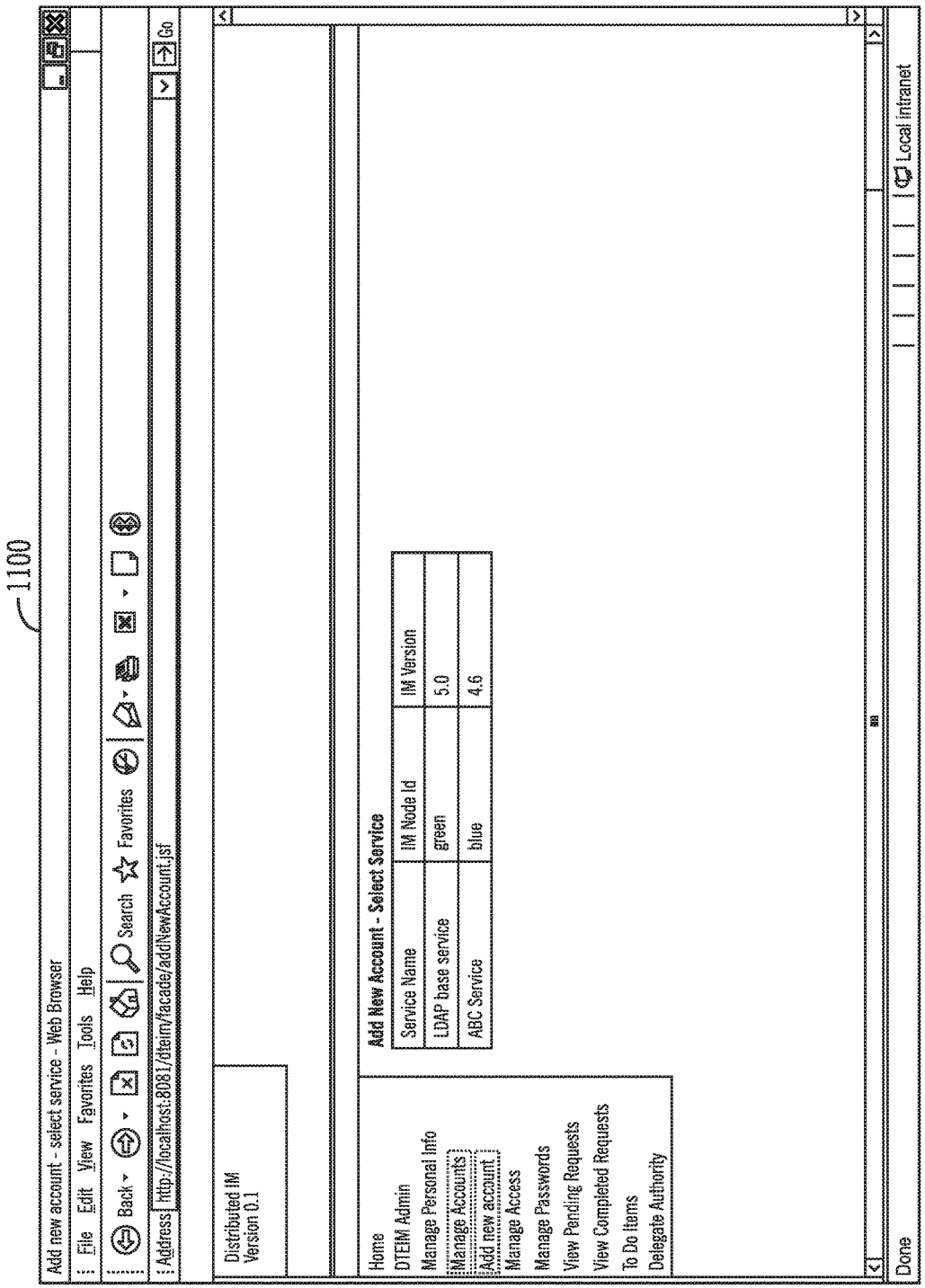
FIG. 11 illustrates selection of an Add New Account menu in a UI screen in accordance with certain embodiments.

FIG. 11 illustrates selection of an Add New Account menu in a UI screen 1100 in accordance with certain embodiments. The DTEIM engine 120 lists all authorized services on which a user can request an account. The list of authorized services is combined from all IM nodes on which the user has a footprint. The DTEIM engine 120 also lists the node on which a service resides and the IM version of the node. In certain embodiments, a service may be a WINDOWS® service or a LINUX® service.

Figure 12:
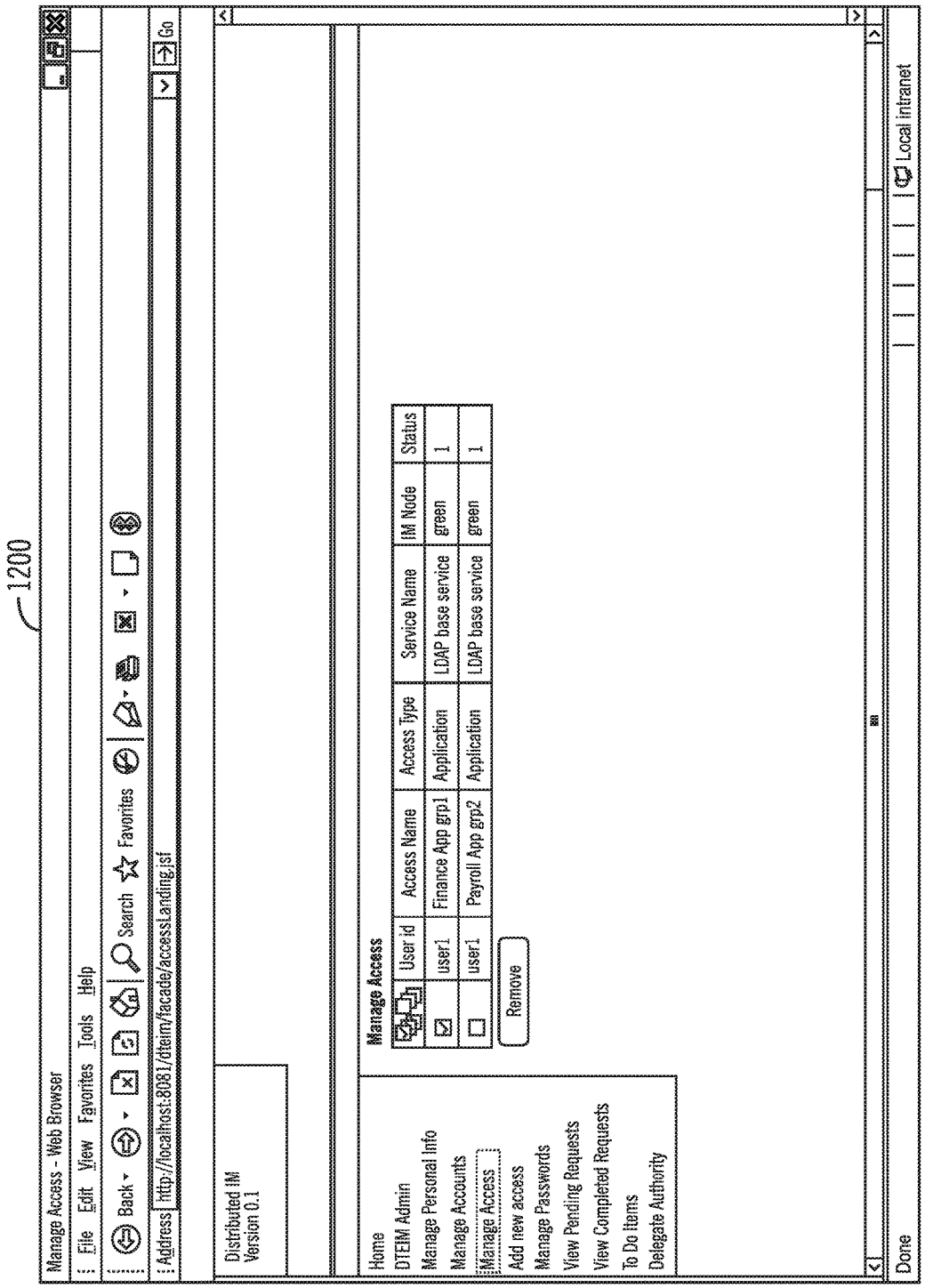
FIG. 12 illustrates selection of a Manage Access menu in a UI screen in accordance with certain embodiments.

FIG. 12 illustrates selection of a Manage Access menu in a UI screen 1200 in accordance with certain embodiments. The Manage Access function shows accesses held by the user. The list may be retrieved from IM nodes. This supports provisioning of new accesses. Accesses may be described as an IM term denoting logical provisioning of a more granular access level on top of an existing userid on an endpoint.

Figure 13:
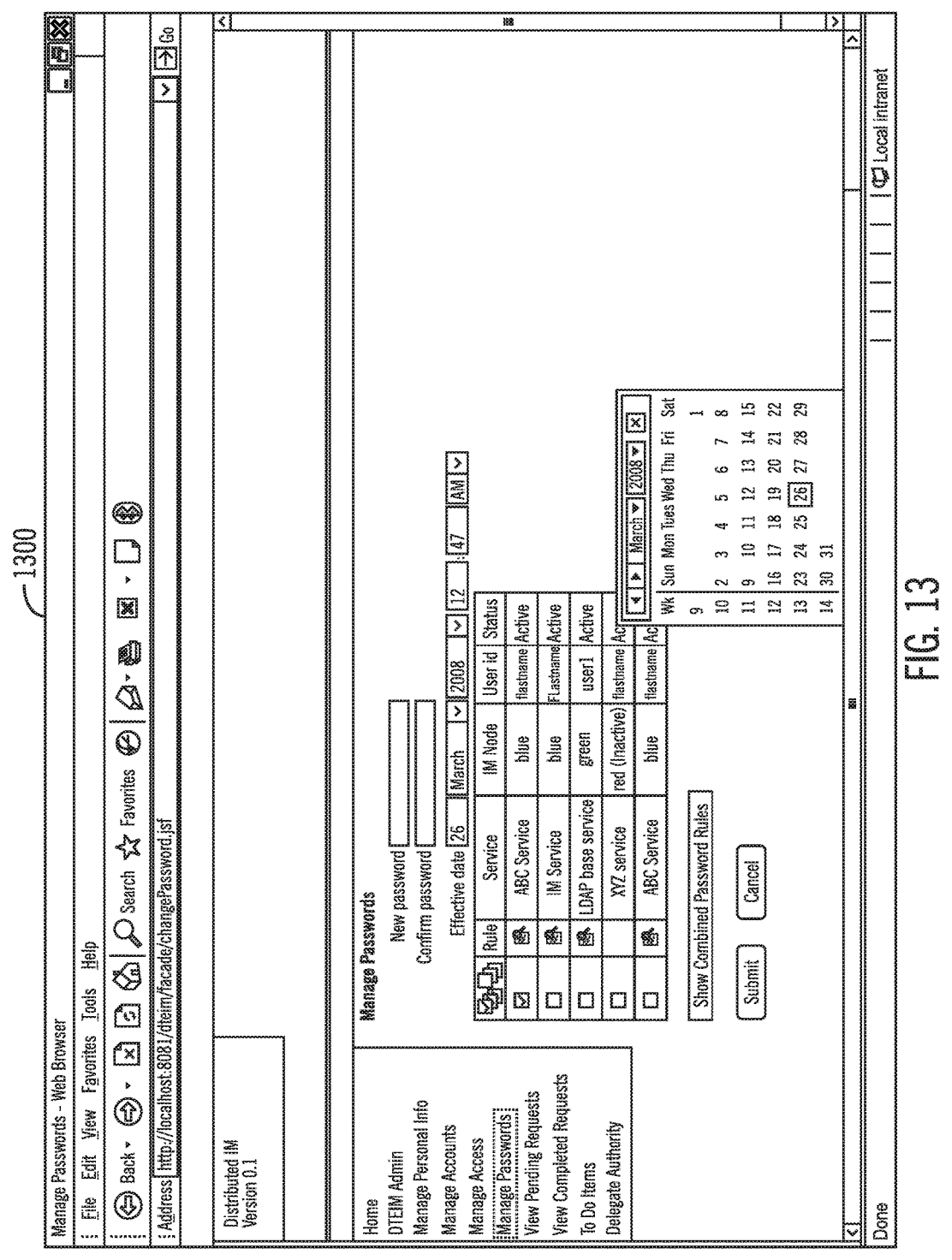

FIG. 13 illustrates selection of a Manage Passwords menu in a UI screen 1300 in accordance with certain embodiments. The Manage Passwords function allows the user to set a password on one or more accounts. The DTEIM engine 120 combines password rules across IM nodes to ensure password validity. When the user submits a password change on accounts across IM nodes, the DTEIM engine 120 decomposes the request into sub-requests by IM node and submits password change operations on the different IM nodes. Also, the DTEIM engine 120 may merge password rules across the IM nodes.

FIG. 14 illustrates a Manage Requests page in a UI screen 1400 in accordance with certain embodiments. The Manage Requests page may be used to retrieve completed or pending requests, and the pending requests may be aborted across the IM nodes.

FIG. 15 illustrates a Manage To Do Items page in a UI screen 1500 in accordance with certain embodiments. The Manage To Do Items page provides individual, as well as, grouped items and provides bulk approve and reject across IM nodes. The DTEIM engine 120 decomposes the approve and reject operations by IM node and submits them to the different IM nodes in parallel.

FIG. 16 illustrates a Review Grouped Recertification Request page in a UI screen 1600 in accordance with certain embodiments. The Review Grouped Recertification Request page provides an example of a bulk approve/reject.

DTEIM API

The DTEIM engine 120 provides an API that can be used by custom user interfaces or Java client applications to communicate with the DTEIM engine 120. The DTEIM Reference UI is an example of an external application that uses the DTEIM API.

The DTEIM API may be JAVA® based. The DTEIM API provides a topology transparent API. With the DTEIM API, the client does not need to be aware of the IM node distribution. The DTEIM API provides self service functions. The DTEIM API can be used by a custom UI or a JAVA® client application to communicate with the DTEIM engine 120.

DTEIM Data Services API

The DTEIM Data Services API represents DTEIM data objects in the DTEIM LDAP data store, and provides entity and search operations.

DTEIM Provider API

The DTEIM Provider API provides access to DTEIM operations. The DTEIM Provider API is limited to providing end user functionality. In certain embodiments, the DTEIM Provider API does not provide administrative and configuration functionality. In certain embodiments, the DTEIM Provider API consists of the following providers:

Account Service Provider Provides Account and Access related API.
Authentication Provider Provides authentication and session related API.
Form Provider Provides API to get and parse forms.
Org Container Service Provider API to traverse organizational containers.
Person Service Provider Provides IM Person related API.
Request Service Provider Provides end user scoped request related API.
Role Service Provider Provides end user scoped organizational role related API.
Service Service Provider Provides IM Service related API.
System User Provider Provides system user (IM Service account) related API.
ToDoProvider Provides assignment and IM "to do" related API.

The DTEIM node also provides an Enterprise JAVA® Bean (EJB) layer interface for DTEIM administration and authentication:

Authentication Manager Manages authentication related functions (an EJB wrapper for Authentication Provider).
Stub Manager Manages stubs in the DTEIM directory server.

Examples of Using the DTEIM API

The examples herein are illustrative of the DTEIM API and are not an exhaustive list of examples for the entire DTEIM API.

FIG. 17 illustrates a code snippet 1700 that is an example of using the DTEIM API to authenticate in accordance with certain embodiments.

FIG. 18 illustrates a code snippet 1800 that is an example of using the DTEIM Data Services API to retrieve account stubs and account data for a user from the DTEIM LDAP data store in accordance with certain embodiments. These account stubs point to accounts with account data across different IM nodes.

FIG. 19 illustrates a code snippet 1900 that is an example of using the DTEIM Data Services API to retrieve account stubs in accordance with certain embodiments.

FIG. 20 illustrates a code snippet 2000 that is an example of updating or creating an account in accordance with certain embodiments.

FIG. 21 illustrates a code snippet 2100 that that is an example of retrieving authorized services for a user for an account in accordance with certain embodiments. The DTEIM API call will result in an aggregated list of services (across IM nodes) on which the user is entitled to an account.

FIG. 22 illustrates a code snippet 2200 that is an example of getting a populated form for a person in accordance with certain embodiments. The DTEIM engine 120 provides a DTEIMForm object that contains the populated form for a person. The DTEIMForm object contains DTEIMFormTab objects, each of which contains DTEIMFormElement objects. Each DTEIMFormElement contains attribute name, value and formatting information. The DTEIM engine 120 supports controls (search control, search match, drop down list etc.) in the form element. These properties can be used to control the rendering of the form using J2EE View technologies. The DTEIM Reference UI uses JAVA® Server Faces (JSF) and Facelets to define a meta form element tag and passes the DTEIMFormElement object to render it.

FIG. 23 illustrates a code snippet 2300 that is an example of getting password rules in accordance with certain embodiments. The DTEIM engine 120 provides an API to get password rules for one or more accounts. If these accounts are hosted on services on different IM nodes, the DTEIM engine 120 merges rules across nodes before returning the password rule.

FIG. 24 illustrates a code snippet 2400 that is an example for a password change in accordance with certain embodiments. The DTEIM engine 120 provides an API to check if the new password is valid before submitting the password change request. This is helpful when changing passwords across services/nodes and preempts request failure due to invalid passwords. The objects generated during password validation are reused during password change in the nodeAwareAccountMOs collection.

FIG. 25 illustrates a code snippet 2500 that is an example for getting a list of "to do" items from participating IM nodes in accordance with certain embodiments.

DTEIM LDAP Data Store

Figure 26:
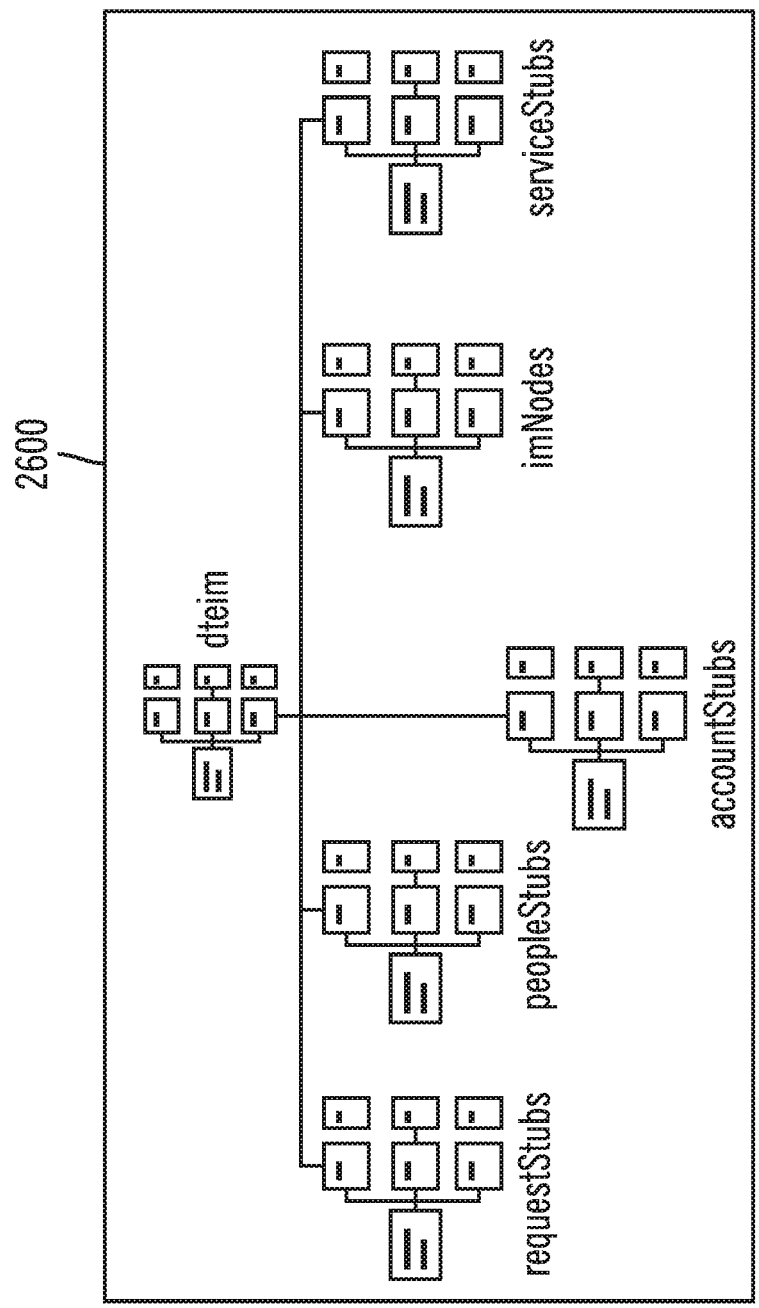
FIG. 26 illustrates a DTEIM data store in accordance with certain embodiments.

FIG. 26 illustrates a DTEIM LDAP data store 2600 in accordance with certain embodiments.

FIGS. 27A, 27B, and 27C illustrate schemas 2700, 2710, 2720 in accordance with certain embodiments.

Figure 28:
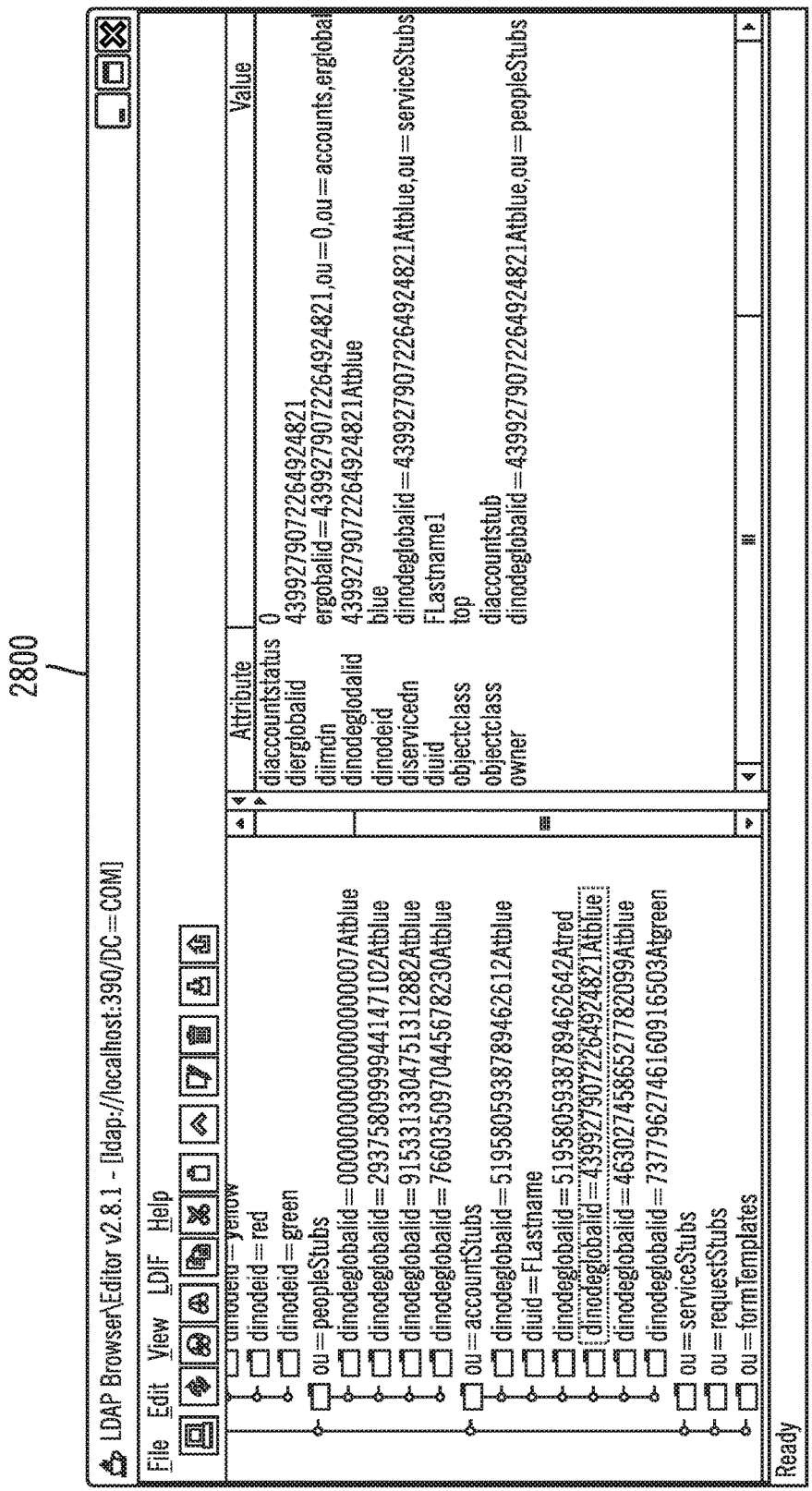
FIG. 28 illustrates an example of an account stub in a user interface in accordance with certain embodiments.

FIG. 28 illustrates an example of an account stub in a user interface 2800 in accordance with certain embodiments. The nodeglobalid attribute is the Relative Distinguished Name (RDN) of the original account object and is generated by the DTEIM engine 120 by using the original RDN of the object and suffixing that RDN with At<nodeId> and to ensure uniqueness. The account stub does not contain any account specific attributes other than the userid (or UID). In certain embodiments, IM service accounts do not contain a node suffix since the DTEIM engine 120 only tracks the IM account on the Main IM node.

Figure 29:
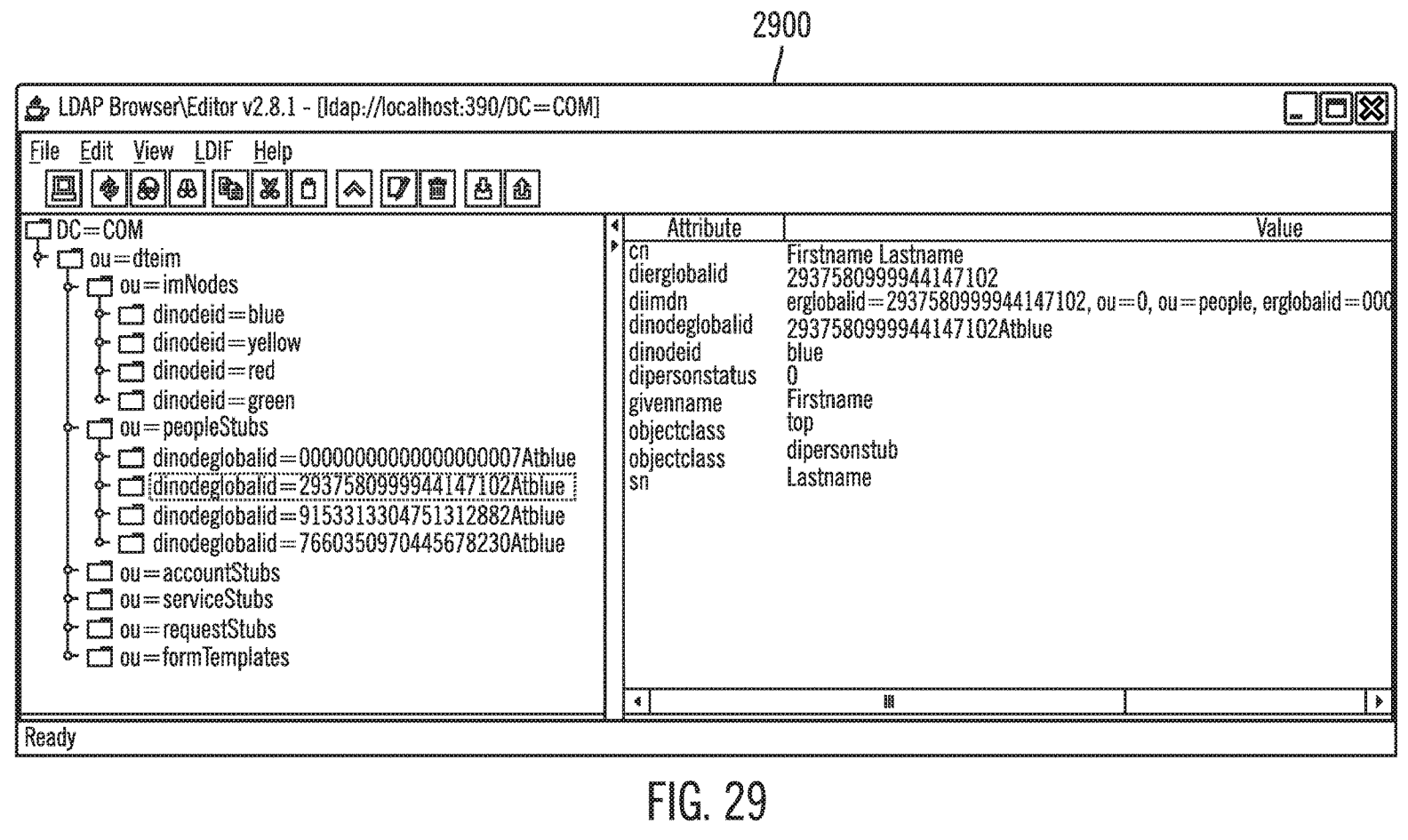

FIG. 29 illustrates an example of a person stub in a user interface 2900 in accordance with certain embodiments. The nodeglobalid attribute is the RDN of the person object and is generated by the DTEIM engine 120 by using the original RDN of the object and suffixing that RDN with At<nodeId> and to ensure uniqueness.

In certain embodiments, the web service runs as a web application co-located with an IM node. The web service may use a simple client and data model. Web Services Description Language (WSDL) files can be used to generate a web services client and data model. WSDL may be used to generate non-JAVA® clients. Also, a pre-generated JAVA® client is provided in certain embodiments. The web service provides a threaded conversation by establishing a session identifier (ID).

Figure 30:
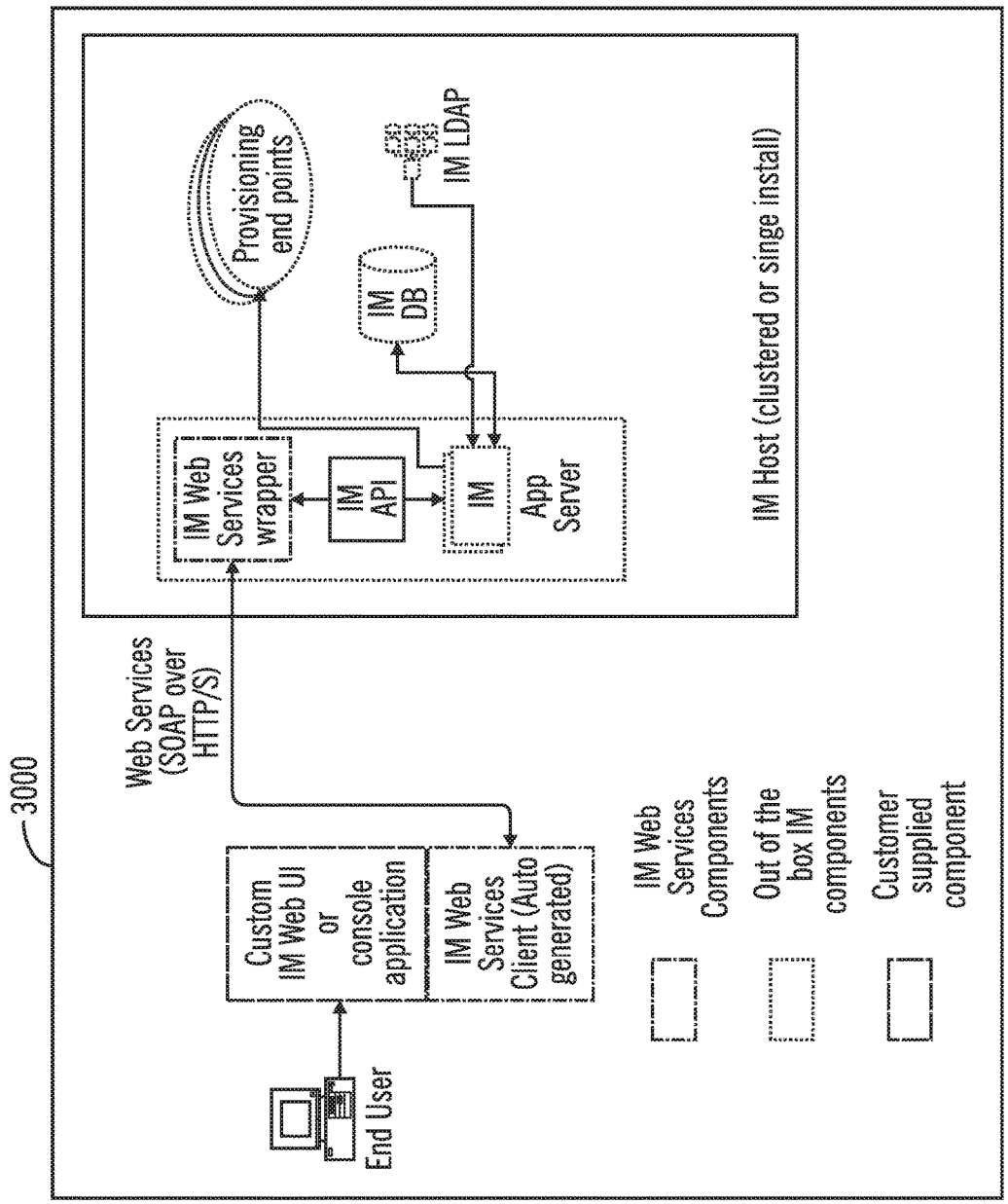
FIG. 30 illustrates a web service architecture in accordance with certain embodiments.

FIG. 30 illustrates a web service architecture 3000 in accordance with certain embodiments. In certain embodiments, the console application is a JAVA® console application. In certain embodiments, the application server is a WEBSPHERE® application server. (WEB SPHERE is a trademark of International Business Machines (IBM) Corporation in the United States, other countries, or both.)

In certain embodiments, the web services suite is made of functionally separate services, with a single proxy façade:
  Session Service
  Account Service
  Form Service
  Organizational Container Service
  Password Service
  Request Service
  Role Service
  Service Service (i.e., a web service to control IM services).
  Search Data Service
  System User Service
  To Do Service
  Access Service
  Provisioning Policy Service
  IM Service (single combined proxy service)

In certain embodiments, a pre-generated web service client provides a web service factory (class). The web service factory "publishes" each web service and eliminates the client's need to determine the service address. The web service factory can provide an instance of any of the IM web services. Obtaining a web service is functionally simple (e.g., web ServiceFactory.getWSPaswordService( )).

FIG. 31 illustrates a code snippet 3100 that is an example for using the web services to authenticate to an IM node and obtain a user's person object in accordance with certain embodiments.

Figure 32:
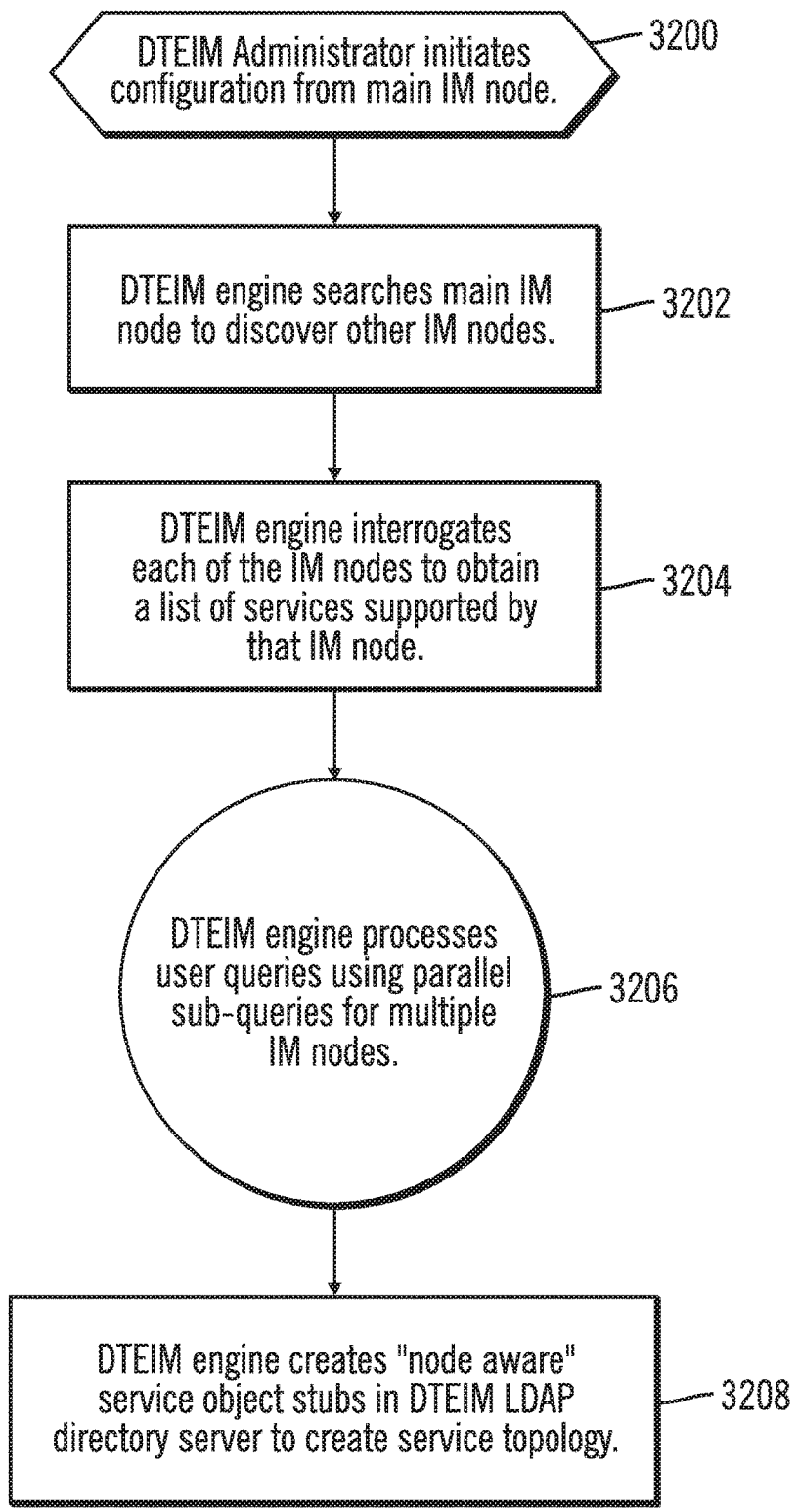
FIG. 32 illustrates, in a flow diagram, logic performed by the DTEIM engine for discovering the IM node topology in accordance with certain embodiments.

FIG. 32 illustrates, in a flow diagram, logic performed by the DTEIM engine 120 for discovering the IM node topology in accordance with certain embodiments. In FIG. 32, the DTEIM engine 120 is performing a configuration task and storing discovered nodes and services in the LDAP. Control begins at block 3200 with the DTEIM administrator initiating configuration from a main IM node. In block 3202, the DTEIM engine 120 searches the main IM node to discover other IM nodes. In block 3204, the DTEIM engine 120 interrogates each of the IM nodes to obtain a list of services supported by that IM node. In block 3206, the DTEIM engine 120 processes user queries using parallel sub-queries for multiple IM nodes. Further details of the processing of user queries in parallel is described with reference to FIG. 36. In block 3208, the DTEIM engine 120 creates "node aware" service object stubs in the DTEIM LDAP directory server to create a service topology.

Figure 33:
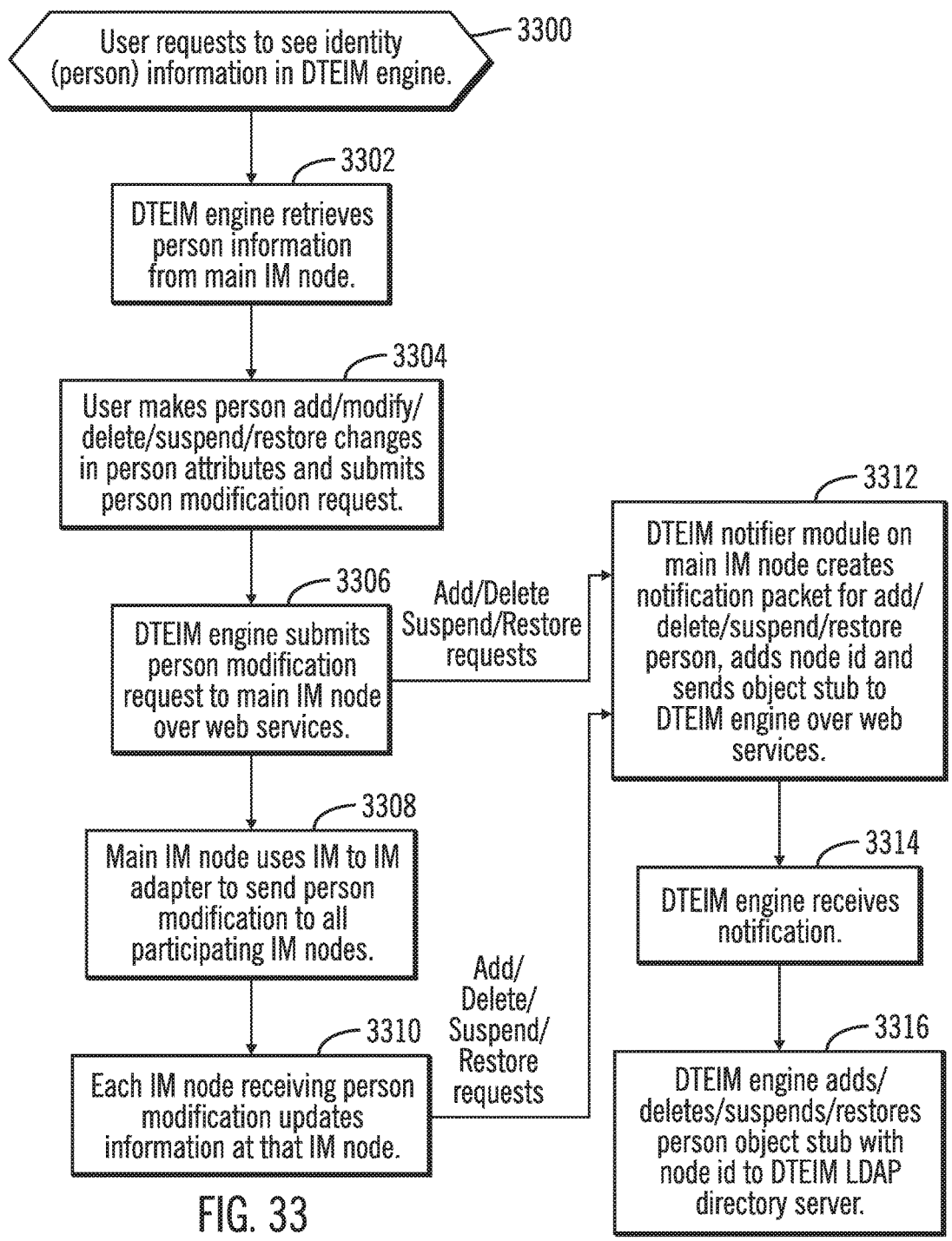
FIG. 33 illustrates, in a flow diagram, logic performed by the DTEIM engine for synchronization of identity information on IM nodes for changes initiated by a user in accordance with certain embodiments.

FIG. 33 illustrates, in a flow diagram, logic performed by the DTEIM engine 120 for synchronization of identity information on IM nodes for changes initiated by a user in accordance with certain embodiments. Control begins at block 3300 with a user requesting to see identity (person) information in the DTEIM engine 120. In block 3302, the DTEIM engine 120 retrieves person information from the main IM node. In block 3304, the user makes add/modify/delete/suspend/restore changes in person attributes (e.g., adds/modifies/deletes/suspends/restores information) and submits a person modification request to the DTEIM engine 120. In block 3306, the DTEIM engine 120 submits the person modification request to the main IM node over web services. From block 3306, processing goes to both blocks 3308 and 3312.

In block 3308, the main IM node uses the IM to IM adapter to send the person modification to all participating IM nodes. In block 3310, each IM node receiving the person modification updates information at that IM node. Also, each IM node receiving the person changes routes the add/delete/suspend/restore requests to the DTEIM engine 120.

In block 3312, the DTEIM notifier module on the main IM node creates a notification packet for add/delete/suspend/restore person, adds a node id, and sends an object stub to the DTEIM engine 120 over web services. In block 3314, the DTEIM engine 120 receives the notification. In block 3316, the DTEIM engine 120 adds/deletes/suspends/restores a person object stub with the node id to the DTEIM LDAP directory server.

Figure 34:
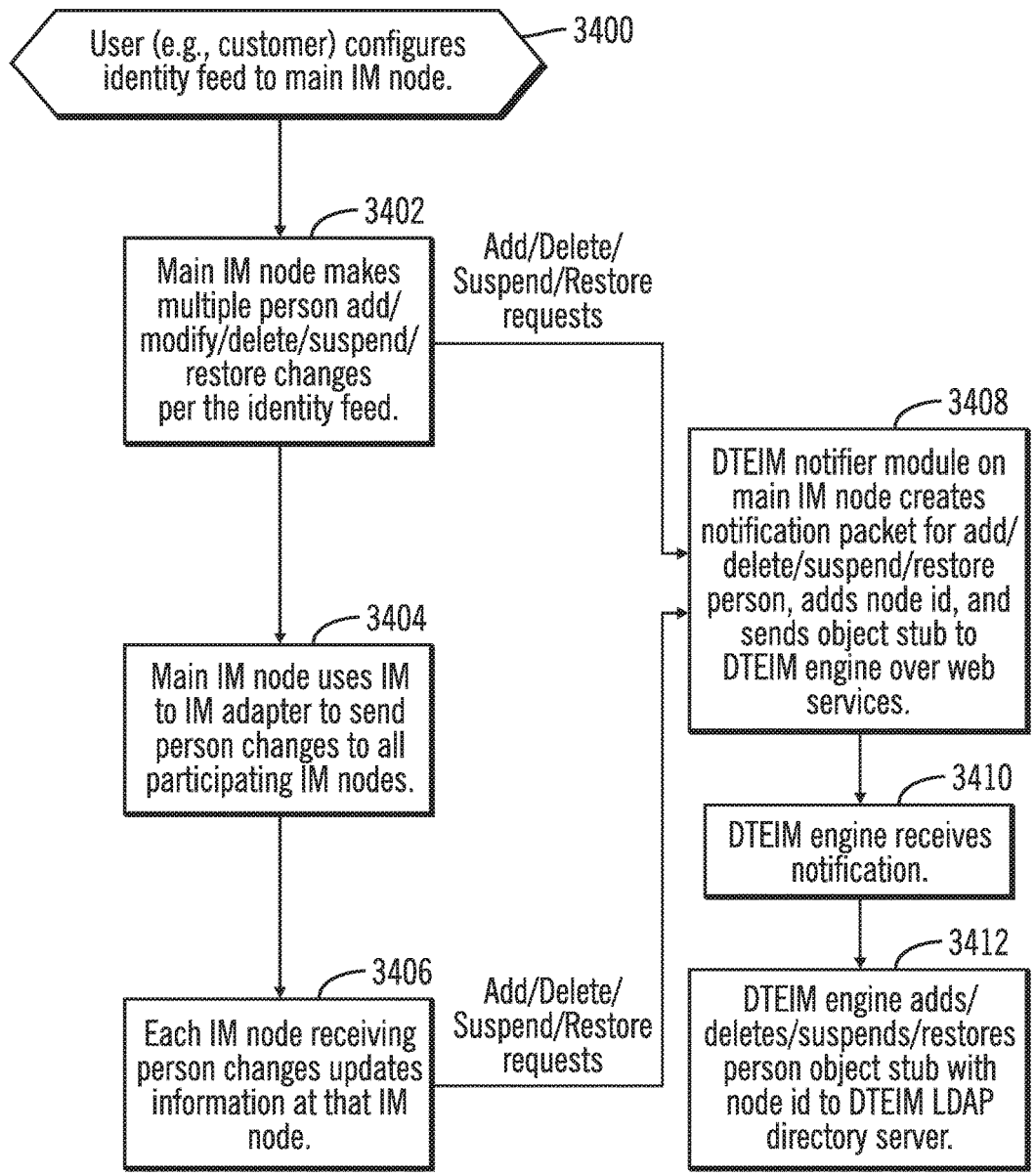
FIG. 34 illustrates, in a flow diagram, logic performed by the DTEIM engine for synchronization of identity information on IM nodes for changes initiated via identity feed in accordance with certain embodiments.

FIG. 34 illustrates, in a flow diagram, logic performed by the DTEIM engine 120 for synchronization of identity information on IM nodes for changes initiated via identity feed in accordance with certain embodiments. Control begins at block 3400 with the user (e.g., a customer) configuring an identify feed to the main IM node. In block

3402, the main IM node makes multiple person add/modify/delete/suspend restore changes per the identity feed. From block 3402, processing continues to both blocks 3404 and 3408. Add/delete/suspend/restore requests are routed to both the DTEIM engine 120 and other IM nodes. However, attribute modifications are routed to the other IM nodes, but these do not need to be notified back to the DTEIM engine 120.

In block 3404, the main IM node uses the IM to IM adapter to send person changes to all participating IM nodes. In block 3406, each IM node receiving the person changes updates information at that IM node. Also, each IM node receiving the person changes routes the add/delete/suspend/restore requests to the DTEIM engine 120.

In block 3408, the DTEIM notifier module on the main IM node creates a notification packet to add/delete/suspend/restore a person, adds a node id, and sends an object stub to the DTEIM engine 120 over web services. In block 3410, the DTEIM engine receives the notification. In block 3412, the DTEIM engine 120 adds/suspends/restores/deletes the person object stub with the node id to the DTEIM LDAP directory server.

Figure 35A:
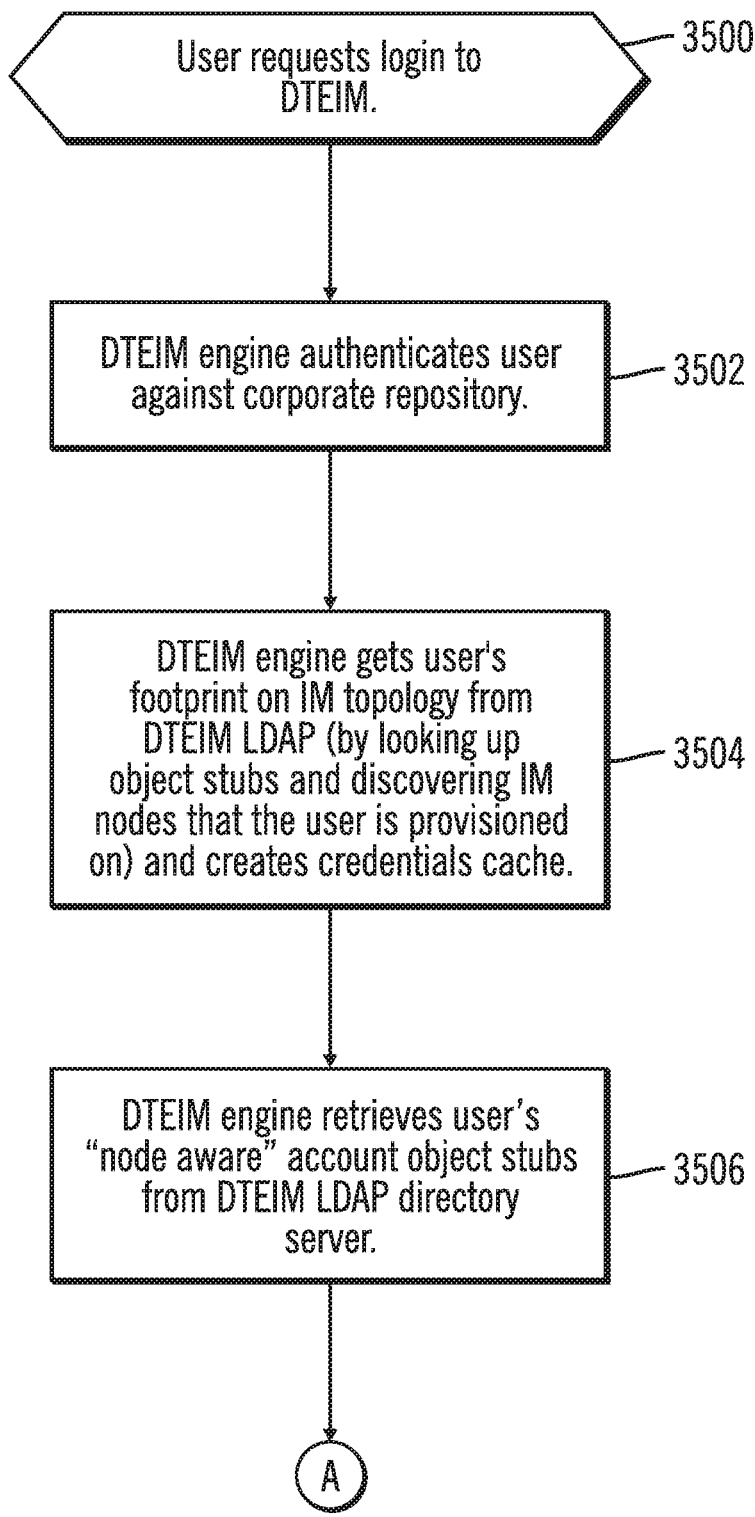
FIG. 35 illustrates, in a flow diagram, logic performed by the DTEIM engine for combining IM information from multiple IM nodes in accordance with certain embodiments.
Figure 35B:
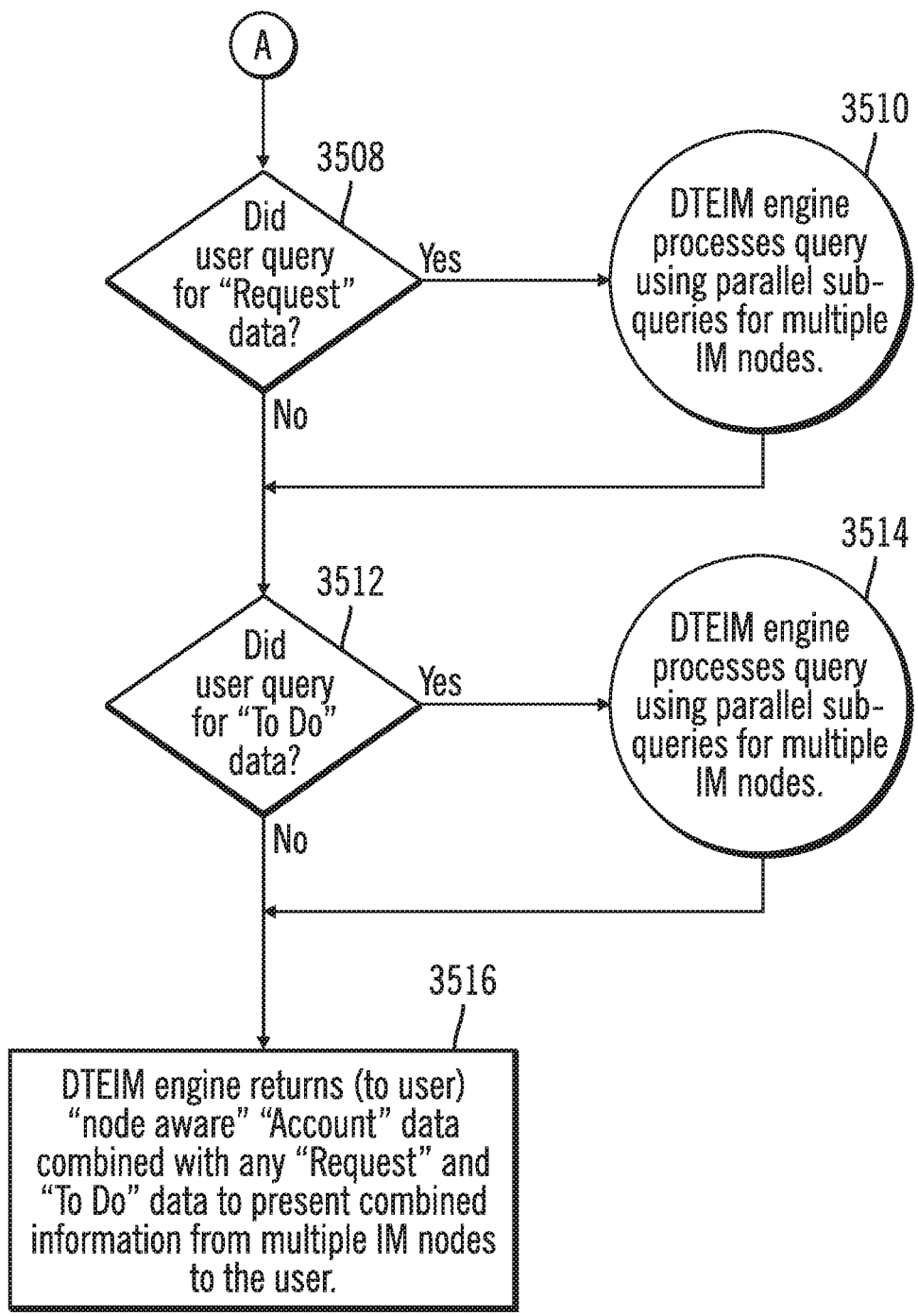

FIG. 35 illustrates, in a flow diagram, logic performed by the DTEIM engine 120 for combining IM information from multiple IM nodes in accordance with certain embodiments. FIG. 35 is formed by FIGS. 35A and 35B. Control begins at block 3500 (FIG. 35A) with the user requesting login to the DTEIM engine 120. In block 3502, the DTEIM engine 120 authenticates the user against a corporate repository. In certain embodiments, the user provides a userid and password, which are used for the authentication against the corporate repository. In block 3504, the DTEIM engine 120 gets the user's footprint on the IM topology from DTEIM LDAP (by looking up object stubs and discovering IM nodes that the user is provisioned on) and creates a credentials cache. For example, if there exist 20 IM nodes, and the user participates on 5 IM nodes, the credentials cache may be used to store credentials used to talk to any of those 5 IM nodes. In block 3506, the DTEIM engine 120 retrieves the user's "node aware" account object stubs from the DTEIM LDAP directory server. From block 3506 (FIG. 35A), processing continues to block 3508 (FIG. 35B).

In block 3508, the DTEIM engine 120 determines whether the user queried for "request" data. If so, processing continues to block 3510, otherwise, processing continues to block 3512. In block 3510, the DTEIM engine 120 processes the query using parallel sub-queries for multiple IM nodes. Further details of the processing of the query in parallel is described with reference to FIG. 36. From block 3510, processing continues to block 3512.

In block 3512, the DTEIM engine 120 determines whether the user queried for "to do" data. If so, processing continues to block 3514, otherwise, processing continues to block 3516. In block 3514, the DTEIM engine 120 processes the query using parallel sub-queries for multiple IM nodes. Further details of the processing of the query in parallel is described with reference to FIG. 36. From block 3514, processing continues to block 3516.

In block 3516, the DTEIM engine 120 returns to the user "node aware" "account" data combined with any "request" and "to do" data that the user may have queried for to present combined information from multiple IM nodes to the user. Thus, if the user has not asked for "request" or "to do" data, the user receives "account" data from multiple IM nodes. However, if the user asked for "request" and/or "to do" data, the user receives combined "account" data and "request" and/or "to do" data from multiple IM nodes. The DTEIM engine 120 has obtained and combined existing identity management information from multiple IM nodes that this user is allowed to access prior to presenting that information.

Figure 36B:
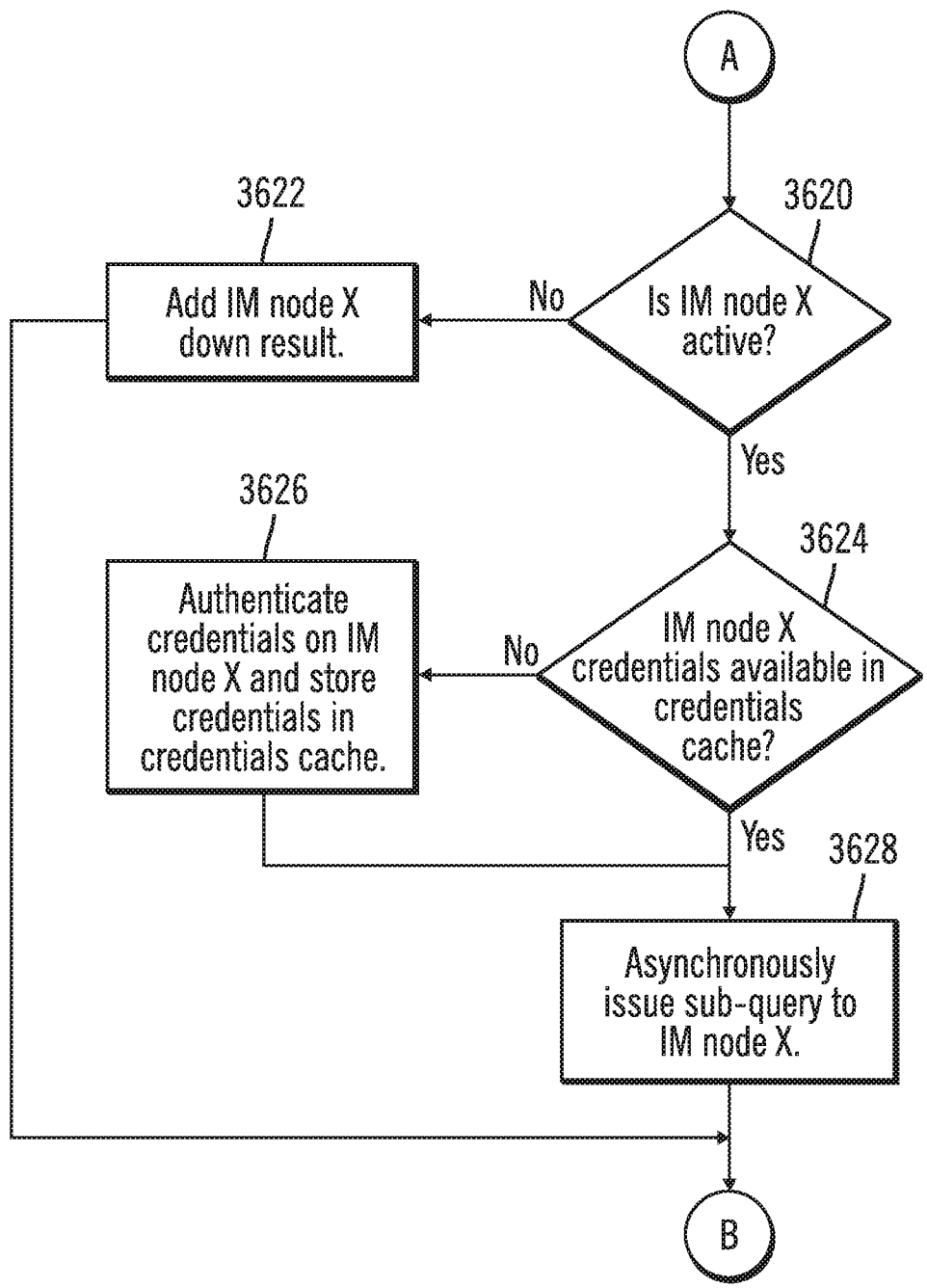
FIG. 36 illustrates, in a flow diagram, logic performed by the DTEIM engine for issuing queries for information in parallel to multiple IM nodes in accordance with certain embodiments.

FIG. 36 illustrates, in a flow diagram, logic performed by the DTEIM engine 120 for issuing queries for information in parallel to multiple IM nodes in accordance with certain embodiments. FIG. 36 is formed by FIGS. 36A and 36B. Control begins at block 3600 (FIG. 36A) with the DTEIM engine 120 using the user's footprint to build an IM node set to query, decomposing the query into sub-queries, and issuing the sub-queries to each IM node in the IM node set in parallel. In certain alternative embodiments, the sub-queries may be the full query that is sent to each IM node.

In particular for each IM node (e.g., IM node 1, IM node 2, ... IM node N), the processing of blocks 3620-3628 (FIG. 36B) is performed in parallel. In block 3620, the DTEIM engine 120 determines whether the IM node X (where X is any IM node, 1, 2, . . . N) is active. If so, processing continues to block 3624, otherwise, processing continues to block 3622. In block 3622, the DTEIM engine 120 adds the IM node X down result. In certain embodiments, a down result indicates an "IM node is down/not reachable" error message. From block 3622, processing continues to block 3608 (FIG. 36A).

In block 3624, the DTEIM engine 120 determines whether the IM node X credentials are available in the credentials cache. If so, processing continues to block 3628, otherwise, processing continues to block 3626. In block 3626, the DTEIM engine 120 authenticates the credentials on the IM node X and stores the credentials in the credentials cache. From block 3626, processing continues to block 3628.

In block 3628, the DTEIM engine 120 asynchronously issues a sub-query to the IM node X. From block 3628 (FIG. 36B), processing continues to block 3608 (FIG. 36A).

In block 3608, the DTEIM engine 120 combines sub-query results asynchronously as IM nodes respond. In block 3610, the DTEIM engine 120 returns a combined "node aware" result set.

Figure 37:
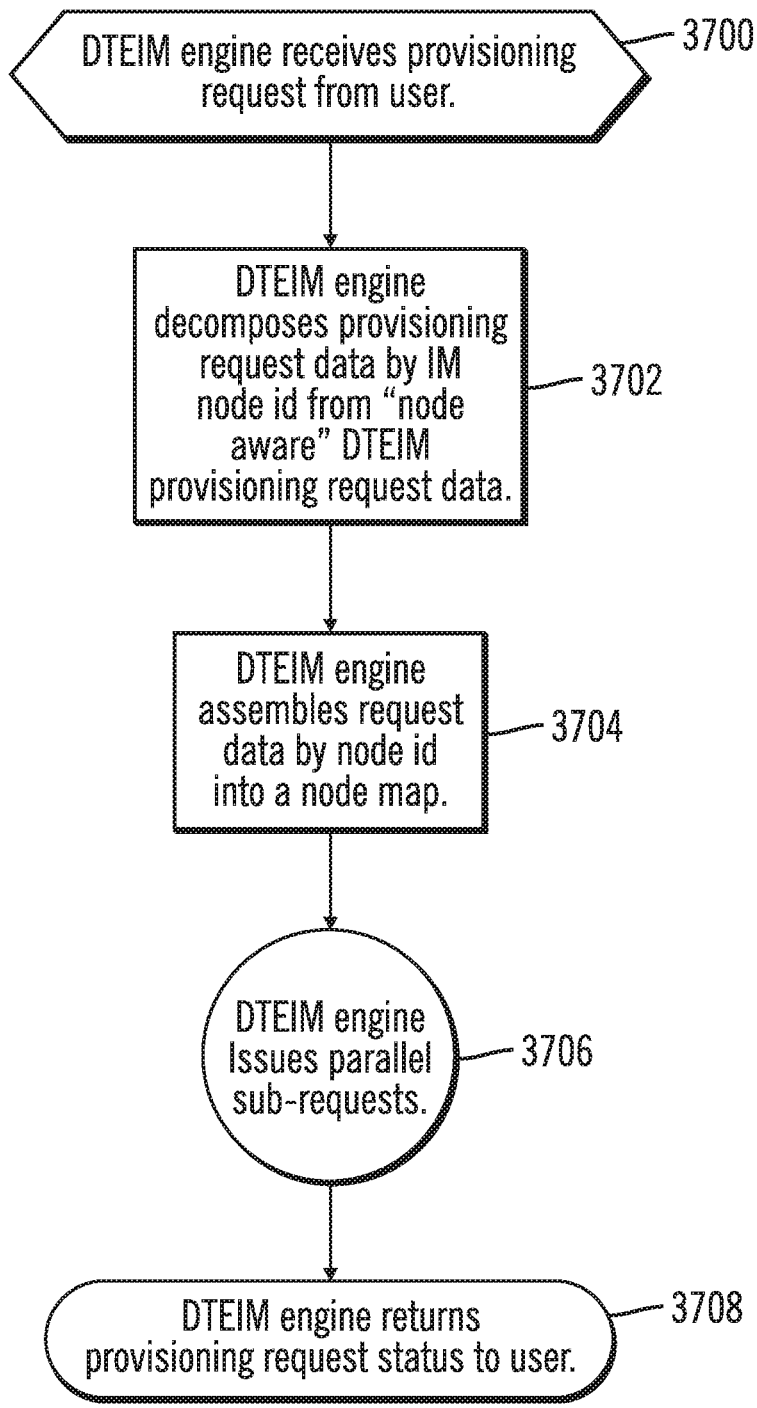
FIG. 37 illustrates, in a flow diagram, logic performed by the DTEIM engine for servicing of user requests in accordance with certain embodiments.

FIG. 37 illustrates, in a flow diagram, logic performed by the DTEIM engine 120 for servicing of user requests in accordance with certain embodiments. Control begins at block 3700 with the DTEIM engine 120 receiving a provisioning request from a user. A provisioning request is a request to change information (e.g., add account/modify account/change password/delete account/suspend account/restore account information). In block 3702, the DTEIM engine 120 decomposes the provisioning request data by IM node id from the "node aware" DTEIM request data. In certain embodiments, the request data is the context data for a request, and the DTEIM engine 120 inserts the IM node awareness.

In block 3704, the DTEIM engine 129 assembles the request data by node id into a node map. In block 3706, the DTEIM engine issues parallel sub-requests. Further details of the processing of the request in parallel is described with reference to FIG. 38. In block 3708, the DTEIM engine 120 returns the provisioning request status (e.g., completed, failed etc.) to the user.

Figure 38A:
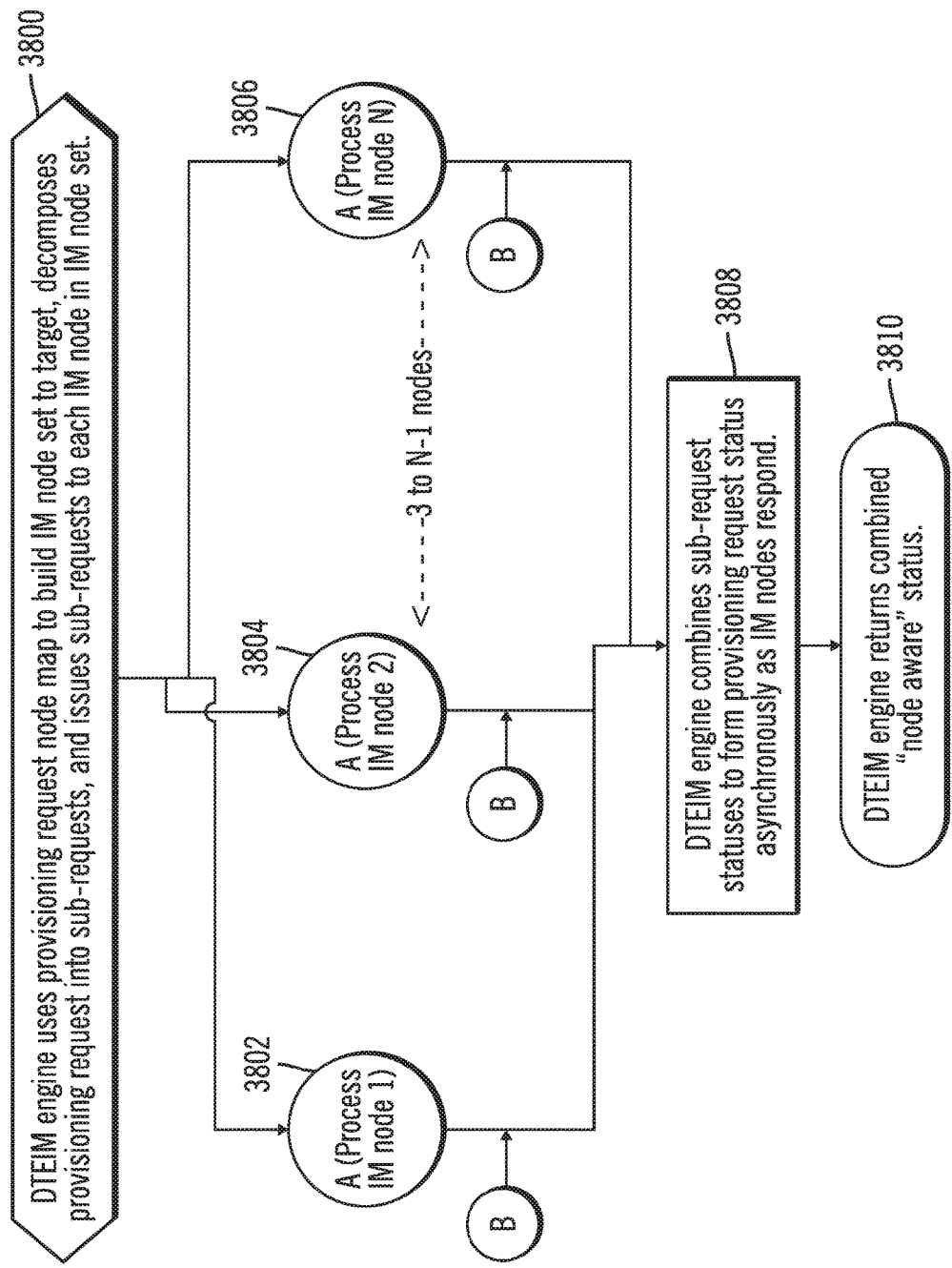
FIG. 38 illustrates, in a flow diagram, logic performed by the DTEIM engine for issuing requests for changes in parallel in accordance with certain embodiments.
Figure 38B:
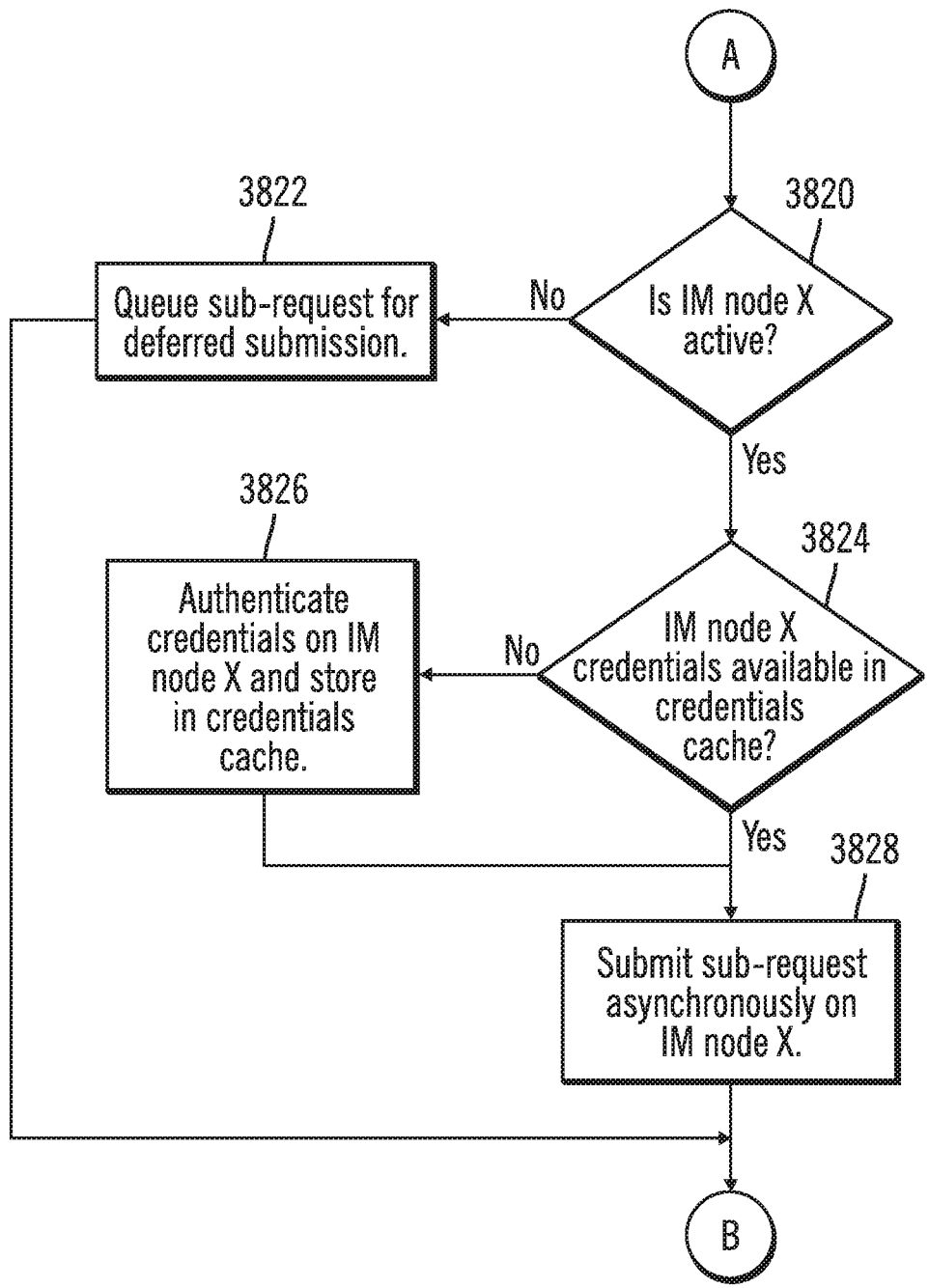

FIG. 38 illustrates, in a flow diagram, logic performed by the DTEIM engine 120 for issuing requests for changes in parallel in accordance with certain embodiments. FIG. 38 is formed by FIGS. 38A and 38B. Control begins at block 3800 with the DTEIM engine using a request node map to build an IM node set to target, decomposing the provisioning request into sub-requests, and issuing sub-requests to each IM node in IM node set. In certain alternative embodiments, the sub-requests may be the full provisioning request that is sent to each IM node.

In particular for each IM node (e.g., IM node 1, IM node 2, ... IM node N), the processing of blocks 3820-3828 (FIG. 38B) is performed in parallel. In block 3820, the DTEIM engine 120 determines whether the IM node X (where X is any IM node, 1, 2, . . . N) is active. If so, processing continues to block 3824, otherwise, processing continues to block 3822. In block 3822, the DTEIM engine 120 queues the sub-request for deferred submission to the IM node X. From block 3822, processing continues to block 3808 (FIG. 38A) showing deferred status for the sub-request.

In block 3824, the DTEIM engine 120 determines whether the IM node X credentials are available in the credentials cache. If so, processing continues to block 3828, otherwise, processing continues to block 3826. In block 3826, the DTEIM engine 120 authenticates the credentials on the IM node X and stores the credentials in the credentials cache. From block 3826, processing continues to block 3828.

In block 3828, the DTEIM engine 120 asynchronously submits a sub-request to the IM node X. From block 3828 (FIG. 38B), processing continues to block 3808 (FIG. 38A).

In block 3808, the DTEIM engine 120 combines the sub-request statuses to form a provisioning request status asynchronously as IM nodes respond. In block 3810, the DTEIM engine 120 returns a combined "node aware" status.

Figure 39:
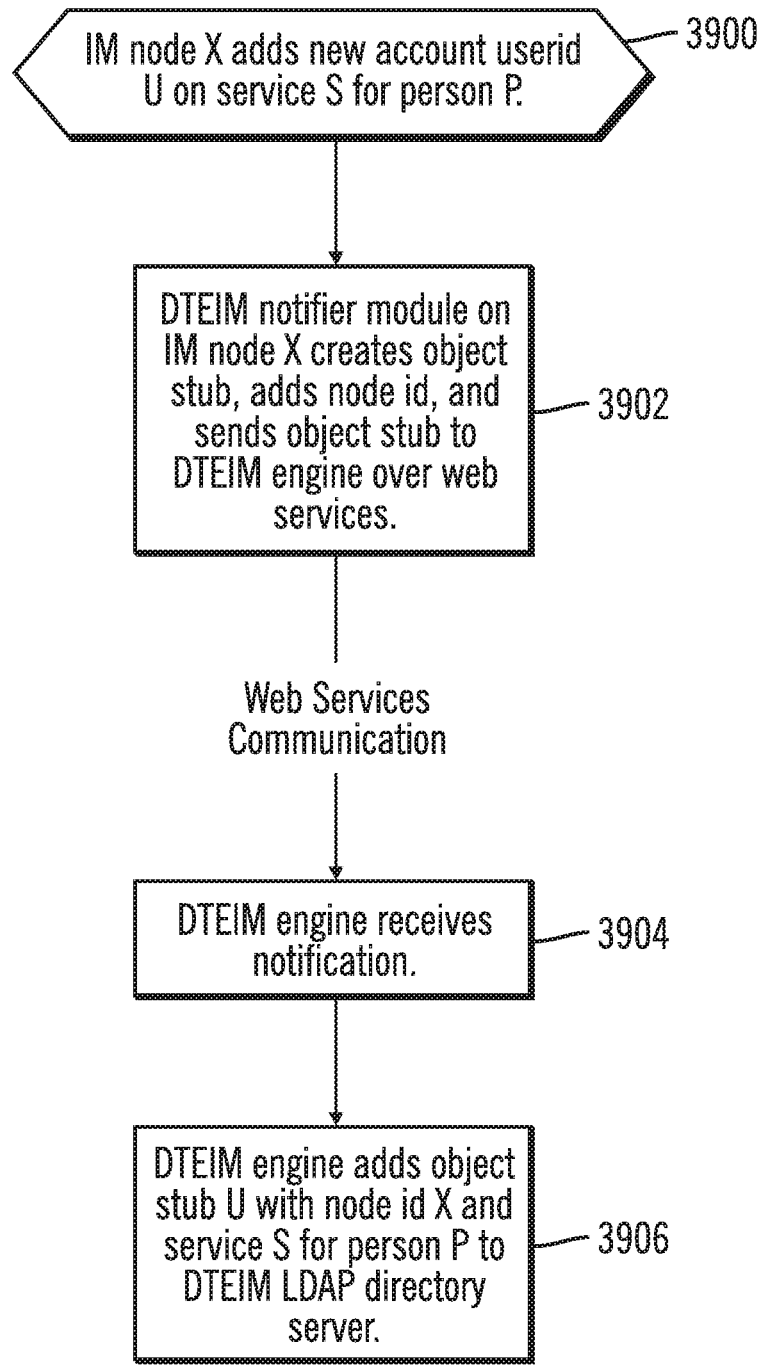
FIG. 39 illustrates, in a flow diagram, logic performed by the DTEIM engine for a user account added directly on an IM node in accordance with certain embodiments.

FIG. 39 illustrates, in a flow diagram, logic performed by the DTEIM engine 120 for a user account added directly on an IM node in accordance with certain embodiments. Control begins at block 3900 with the IM node X adding a new account userid U on service S for person P. In block 3902, the DTEIM notifier module on IM node X creates an object stub, adds a node id, and sends the object stub to the DTEIM engine 120 over web services. In block 3904, the DTEIM engine 120 receives the notification. In block 3906, the DTEIM engine 120 adds the object stub U with node id X and service S for person P to the DTEIM LDAP directory server.

Figure 40:
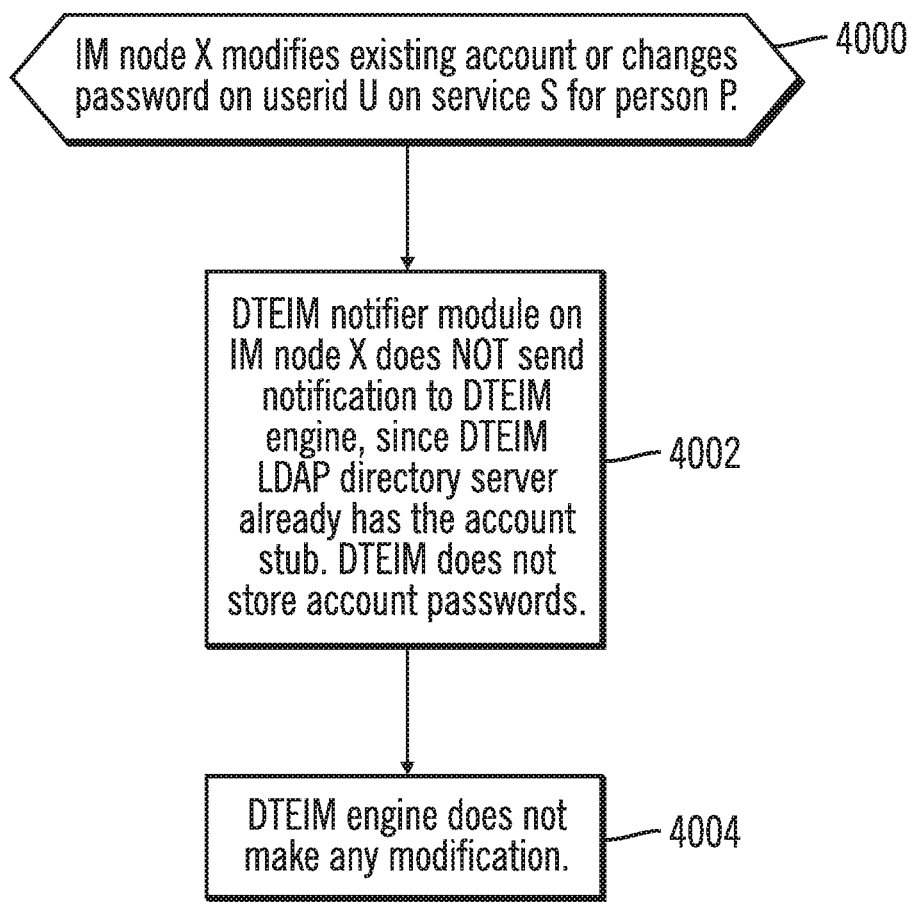
FIG. 40 illustrates, in a flow diagram, logic performed by the DTEIM engine for an account modification or password change done directly on an IM node in accordance with certain embodiments.

FIG. 40 illustrates, in a flow diagram, logic performed by the DTEIM engine 120 for an account modification or password change done directly on an IM node in accordance with certain embodiments. Control begins at block 4000 with the IM node X modifying an existing account or changing a password on userid U on service S for person P. In block 4002, the DTEIM notifier module on the IM node X does not send a notification to the DTEIM engine 120, since the DTEIM LDAP directory server already has the account stub. That is, in certain embodiments, the DTEIM LDAP directory server does not store account passwords. In block 4004, the DTEIM engine 120 does not make any modification in response to the modification of the existing account or the change of the password.

Figure 41:
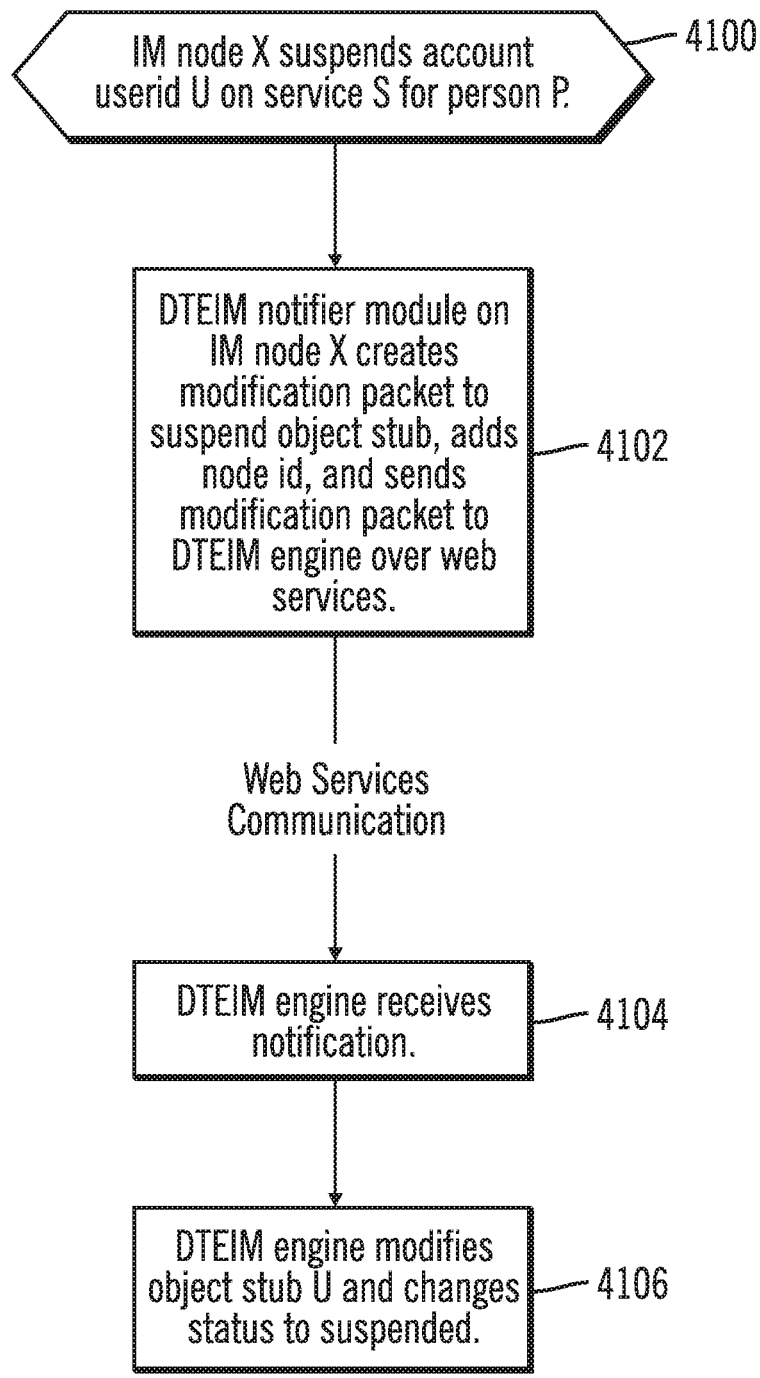
FIG. 41 illustrates, in a flow diagram, logic performed by the DTEIM engine for an account suspension on an IM node in accordance with certain embodiments.

FIG. 41 illustrates, in a flow diagram, logic performed by the DTEIM engine 120 for an account suspension on an IM node in accordance with certain embodiments. Control begins at block 4100 with the IM node X suspending an account userid U on service S for person P. In block 4102, the DTEIM notifier module on the IM node X creates a modification packet to suspend the object stub, adds a node id, and sends the modification packet to the DTEIM engine 120 over web services. In block 4104, the DTEIM engine 120 receives the notification. In block 4106, the DTEIM engine 120 modifies the object stub U and changes the status to suspended.

Figure 42:
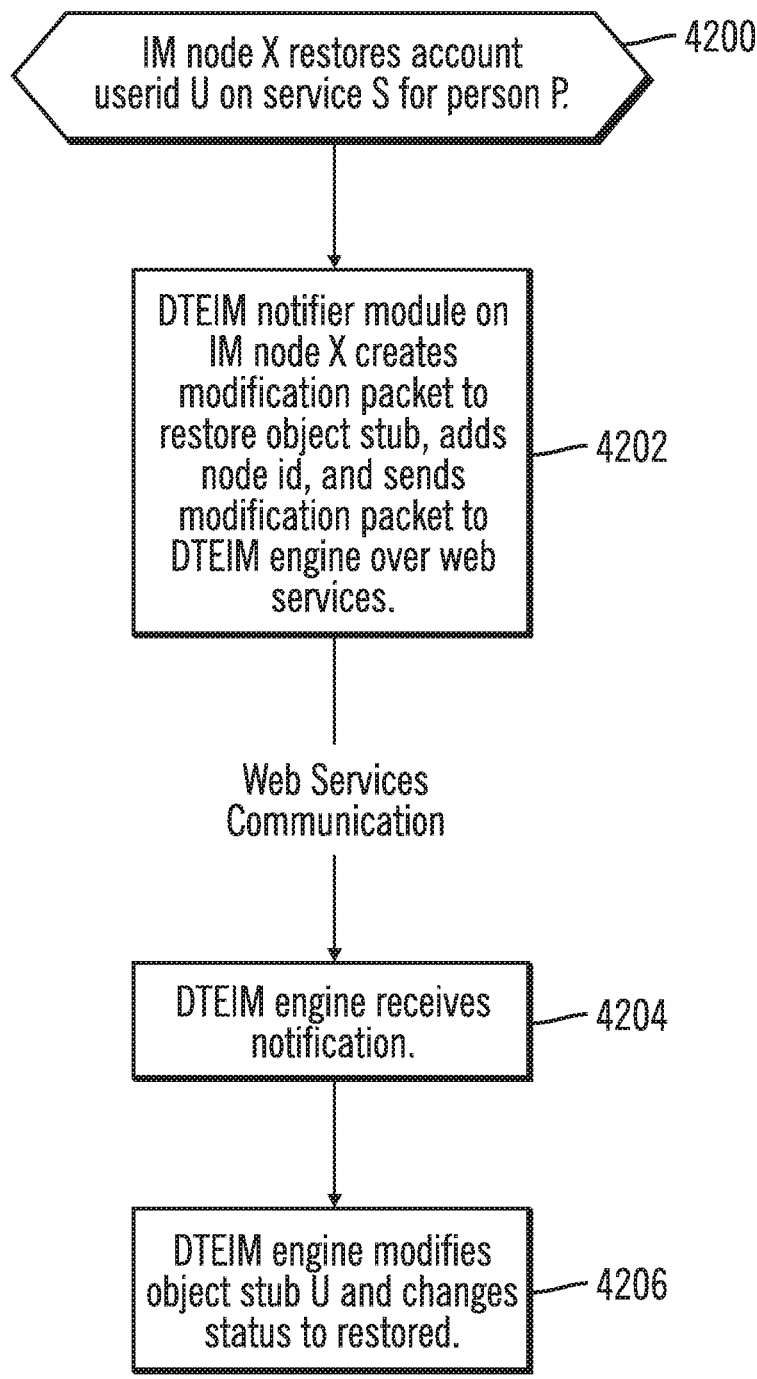
FIG. 42 illustrates, in a flow diagram, logic performed by the DTEIM engine for an account restoration on an IM node in accordance with certain embodiments.

FIG. 42 illustrates, in a flow diagram, logic performed by the DTEIM engine 120 for an account restoration on an IM node in accordance with certain embodiments. Control begins at block 4200 with the IM node X restoring an account userid U on service S for person P. In block 4202, the DTEIM notifier module on the IM node X creates a modification packet to restore the object stub, adds a node id, and sends the modification packet to the DTEIM engine 120 over web services. In block 4204, the DTEIM engine 120 receives the notification. In block 4206, the DTEIM engine 120 modifies the object stub U and changes the status to restored.

Figure 43:
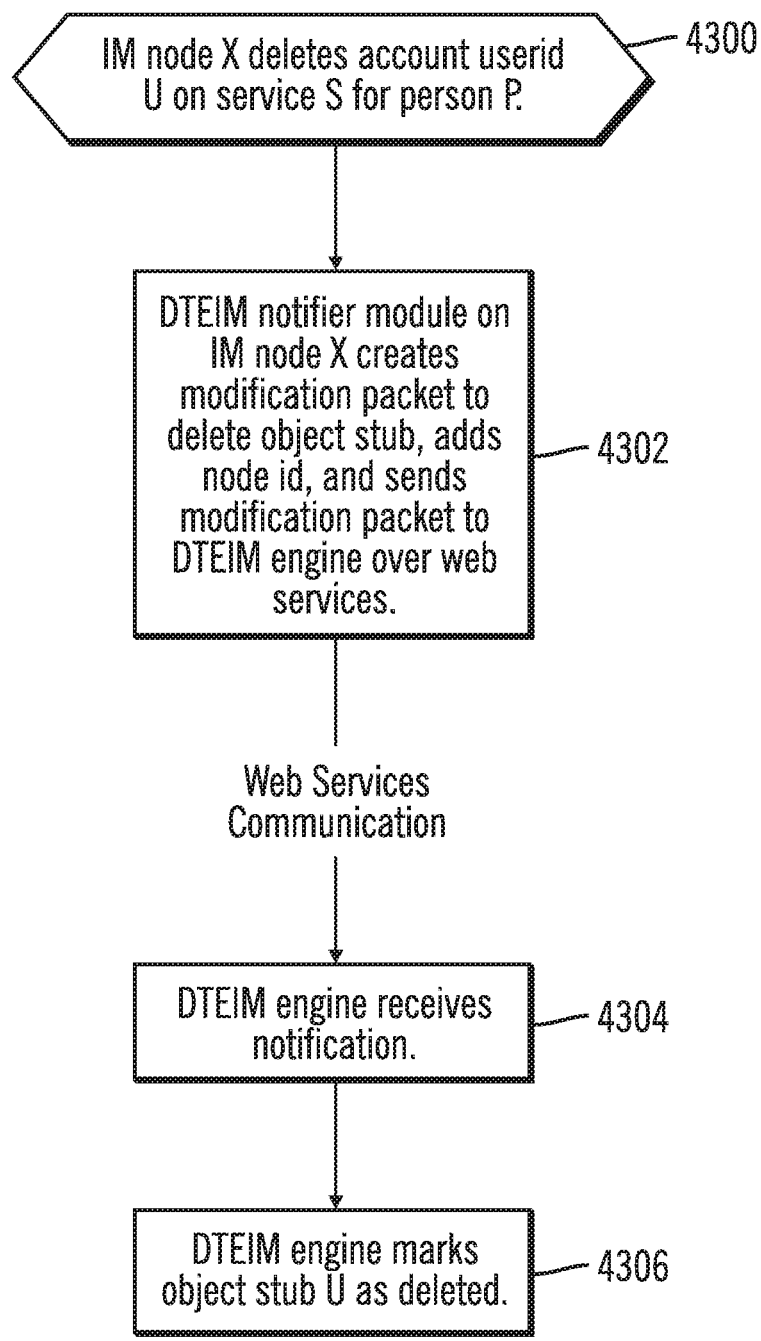
FIG. 43 illustrates, in a flow diagram, logic performed by the DTEIM engine for an account deletion on an IM node in accordance with certain embodiments.

FIG. 43 illustrates, in a flow diagram, logic performed by the DTEIM engine 120 for an account deletion on an IM node in accordance with certain embodiments. Control begins at block 4300 with the IM node X deleting an account userid U on service S for person P. In block 4302, the DTEIM notifier module on the IM node X creates a modification packet to delete the object stub, adds a node id, and sends a modification packet to the DTEIM engine 120 over web services. In block 4304, the DTEIM engine 120 receives the notification. In block 4306, the DTEIM engine 120 marks the object stub U as deleted.

Thus, the DTEIM architecture is may be used for very large identity management implementations. The DTEIM architecture makes identity management progressively scalable by deploying the identity management in a distributed topology. The DTEIM architecture increases availability by allowing staggered maintenance of the IM infrastructure, improves performance, supports heterogeneous versions of IMs and decentralizes administration. The decentralized model improves manageability and workload distribution.

The DTEIM architecture tracks system identities using distributed IM nodes. Each IM node can collaborate with the other IM nodes to enable configurations to the network architecture in a scalable/distributed fashion.

The DTEIM architecture allows localized administration and centralized identity and account operations. The DTEIM architecture is able to provide one off provisioning for a subset of a population (e.g., an isolated lab).

With the DTEIM architecture, more IM nodes may be added as more services are rolled out. Since individual IMs process their own subset of services and reconciliations, performance bottlenecks are avoided.

Additional Embodiment Details

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, solid state memory, magnetic tape or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the embodiments of the invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational processing (e.g., operations or steps) to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The code implementing the described operations may further be implemented in hardware logic or circuitry (e.g., an integrated circuit chip, Programmable Gate Array (PGA), Application Specific Integrated Circuit (ASIC), etc. The hardware logic may be coupled to a processor to perform operations.

The DTEIM engine 120 may be implemented as hardware (e.g., hardware logic or circuitry), software, or a combination of hardware and software.

Figure 44:
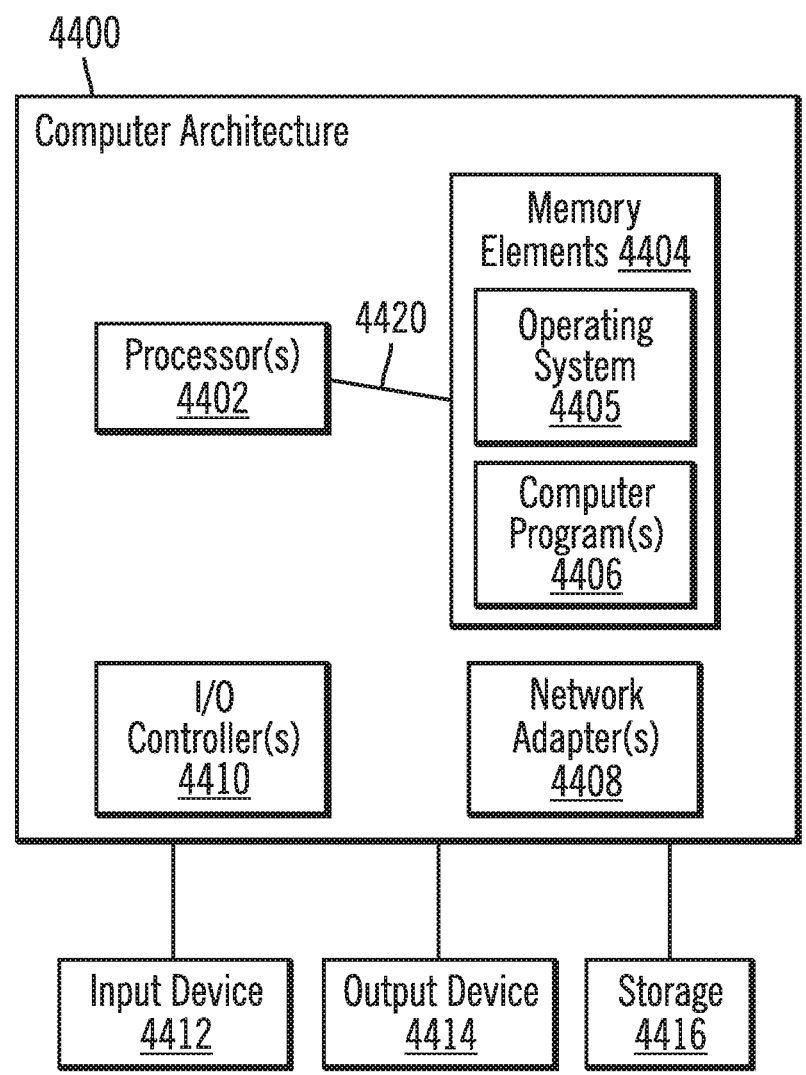
FIG. 44 illustrates a computer architecture that may be used in accordance with certain embodiments.

FIG. 44 illustrates a computer architecture 4400 that may be used in accordance with certain embodiments. A DTEIM server and/or IM node may implement computer architecture 4400. The computer architecture 4400 is suitable for storing and/or executing program code and includes at least one processor 4402 coupled directly or indirectly to memory elements 4404 through a system bus 4420. The memory elements 4404 may include local memory employed during actual execution of the program code, bulk storage, and cache memories which provide temporary storage of at least some program code in order to reduce the number of times code must be retrieved from bulk storage during execution. The memory elements 4404 include an operating system 4405 and one or more computer programs 4406.

Input/Output (I/O) devices 4412, 4414 (including but not limited to keyboards, displays, pointing devices, etc.) may be coupled to the system either directly or through intervening I/O controllers 4410.

Network adapters 4408 may also be coupled to the system to enable the data processing system to become coupled to other data processing systems or remote printers or storage devices through intervening private or public networks. Modems, cable modem and Ethernet cards are just a few of the currently available types of network adapters 4408.

The computer architecture 4400 may be coupled to storage 4416 (e.g., a non-volatile storage area, such as magnetic disk drives, optical disk drives, a tape drive, etc.). The storage 4416 may comprise an internal storage device or an attached or network accessible storage. Computer programs 4406 in storage 4416 may be loaded into the memory elements 4404 and executed by a processor 4402 in a manner known in the art.

The computer architecture 4400 may include fewer components than illustrated, additional components not illustrated herein, or some combination of the components illustrated and additional components. The computer architecture 4400 may comprise any computing device known in the art, such as a mainframe, server, personal computer, workstation, laptop, handheld computer, telephony device, network appliance, virtualization device, storage controller, etc.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of embodiments of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

The foregoing description of embodiments of the invention has been presented for the purposes of illustration and description. It is not intended to be exhaustive or to limit the embodiments to the precise form disclosed. Many modifications and variations are possible in light of the above teaching. It is intended that the scope of the embodiments be limited not by this detailed description, but rather by the claims appended hereto. The above specification, examples and data provide a complete description of the manufacture and use of the composition of the embodiments. Since many embodiments may be made without departing from the spirit and scope of the invention, the embodiments reside in the claims hereinafter appended or any subsequently-filed claims, and their equivalents.

The invention claimed is:

1. A method, comprising:
   in response to receiving a request to login, authenticating a user against a repository;
   discovering Identity Manager (IM) nodes in an IM topology that the user is provisioned on by looking up object stubs;
   creating a credentials cache to store credentials for the user for the IM nodes that the user is provisioned on;
   retrieving node aware account object stubs for the user;
   determining whether a first query to retrieve data and a second query to process data have been received;
   in response to determining that the first query and the second query have been received,
      for each of the first query and the second query,
         generating sub-queries;
         identifying IM nodes that are to perform the sub-queries in parallel and that are selected based on a list of services supported by each of the IM nodes;
         issuing the sub-queries to the IM nodes using the credentials in the credentials cache; and
         receiving results of the sub-queries from each of the IM nodes;
      combining the results of each of the sub-queries for the first query and the second query; and
      returning node aware account data combined with the combined results with retrieved data for the first query and processed data for the second query; and
   in response to determining that the first query and the second query have not been received, returning the node aware account data.

2. The method of claim 1, further comprising:
   discovering the IM nodes in the IM topology; and
   interrogating each of the IM nodes to obtain a list of services supported by that IM node.

3. The method of claim 1, further comprising:
   receiving a provisioning request, wherein the provisioning request is one of creating an account, modifying the account, suspending the account, restoring the account, deleting the account, approving a pending to do item, rejecting another pending to do item, requesting information on pending to do items, and aborting a pending request.

4. The method of claim 1, further comprising:
   in response to receiving a request to view identity information, retrieving the identity information from a main IM node of the IM nodes; and
   in response to receiving a change to the identity information,
      issuing the change from the main IM node to other IM nodes; and
      updating an object stub in a directory server.

5. A computer program product for identity information management, the computer program product comprising:
   a non-transitory computer readable storage medium having computer readable program code embodied therewith, wherein the computer readable program code, when executed by a processor of a computer, configured to perform:
   in response to receiving a request to login, authenticating a user against a repository;
   discovering Identity Manager (IM) nodes in an IM topology that the user is provisioned on by looking up object stubs;
   creating a credentials cache to store credentials for the user for the IM nodes that the user is provisioned on;
   retrieving node aware account object stubs for the user;
   determining whether a first query to retrieve data and a second query to process data have been received;
   in response to determining that the first query and the second query have been received,
      for each of the first query and the second query,
         generating sub-queries;
         identifying IM nodes that are to perform the sub-queries in parallel and that are selected based on a list of services supported by each of the IM nodes;

issuing the sub-queries to the IM nodes using the credentials in the credentials cache; and receiving results of the sub-queries from each of the IM nodes;

combining the results of each of the sub-queries for the first query and the second query; and returning node aware account data combined with the combined results with retrieved data for the first query and processed data for the second query; and in response to determining that the first query and the second query have not been received, returning the node aware account data.

6. The computer program product of claim 5, wherein the computer readable program code, when executed by the processor of the computer, is configured to perform:

discovering the IM nodes in the IM topology; and interrogating each of the IM nodes to obtain a list of services supported by that IM node.

7. The computer program product of claim 5, wherein the computer readable program code, when executed by the processor of the computer, is configured to perform:

receiving a provisioning request, wherein the provisioning request is one of creating an account, modifying the account, suspending the account, restoring the account, deleting the account, approving a pending to do item, rejecting another pending to do item, requesting information on pending to do items, and aborting a pending request.

8. The computer program product of claim 5, wherein the computer readable program code, when executed by the processor of the computer, is configured to perform:

in response to receiving a request to view identity information, retrieving the identity information from a main IM node of the IM nodes; and in response to receiving a change to the identity information, issuing the change from the main IM node to other IM nodes; and updating an object stub in a directory server.

9. A system, comprising:

a processor; and non-transitory storage coupled to the processor, wherein the non-transitory storage stores a computer program, and wherein the processor is configured to execute the computer program to perform operations, the operations comprising:

in response to receiving a request to login, authenticating a user against a repository;

discovering Identity Manager (IM) nodes in an IM topology that the user is provisioned on by looking up object stubs;

creating a credentials cache to store credentials for the user for the IM nodes that the user is provisioned on;

retrieving node aware account object stubs for the user;

determining whether a first query to retrieve data and a second query to process data have been received;

in response to determining that the first query and the second query have been received, for each of the first query and the second query, generating sub-queries;

identifying IM nodes that are to perform the sub-queries in parallel and that are selected based on a list of services supported by each of the IM nodes;

issuing the sub-queries to the IM nodes using the credentials in the credentials cache; and receiving results of the sub-queries from each of the IM nodes;

combining the results of each of the sub-queries for the first query and the second query; and returning node aware account data combined with the combined results with retrieved data for the first query and processed data for the second query; and in response to determining that the first query and the second query have not been received, returning the node aware account data.

10. The system of claim 9, wherein the operations further comprise:

discovering the IM nodes in the IM topology; and interrogating each of the IM nodes to obtain a list of services supported by that IM node.

11. The system of claim 9, wherein the operations further comprise:

receiving a provisioning request, wherein the provisioning request is one of creating an account, modifying the account, suspending the account, restoring the account, deleting the account, approving a pending to do item, rejecting another pending to do item, requesting information on pending to do items, and aborting a pending request.

12. The system of claim 9, wherein the operations further comprise:

in response to receiving a request to view identity information, retrieving the identity information from a main IM node of the IM nodes; and in response to receiving a change to the identity information, issuing the change from the main IM node to other IM nodes; and updating an object stub in a directory server.

* * * * *